(12) United States Patent
Nakagawa et al.

(10) Patent No.: US 7,809,494 B2
(45) Date of Patent: Oct. 5, 2010

(54) ENGINE CONTROL APPARATUS

(75) Inventors: Shinji Nakagawa, Hitachinaka (JP);
Kazuhiko Kanetoshi, Hitachinaka (JP);
Kozo Katogi, Hitachi (JP); Takanobu Ichihara, Naka (JP); Minoru Ohsuga, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 255 days.

(21) Appl. No.: 12/194,128

(22) Filed: Aug. 19, 2008

(65) Prior Publication Data
US 2009/0088948 A1 Apr. 2, 2009

(30) Foreign Application Priority Data

Sep. 27, 2007 (JP) .............................. 2007-250384
Sep. 27, 2007 (JP) .............................. 2007-250387

(51) Int. Cl.
*G06F 19/00* (2006.01)
*F02M 51/00* (2006.01)

(52) U.S. Cl. .................... 701/113; 701/104; 123/491

(58) Field of Classification Search ................ 123/478, 123/480, 491–493; 701/101–105, 113, 115
See application file for complete search history.

(56) References Cited

U.S. PATENT DOCUMENTS

| 4,388,906 A | * | 6/1983 | Sugiyama et al. ............. 123/492 |
| 4,481,928 A | * | 11/1984 | Takimoto et al. ............. 123/492 |
| 4,667,640 A | * | 5/1987 | Sekozawa et al. ............. 123/492 |
| 5,501,194 A | * | 3/1996 | Kanehara et al. ............. 123/470 |
| 5,690,074 A | | 11/1997 | Ogawa |
| 7,360,512 B1 | * | 4/2008 | Asmus et al. ............. 123/41.56 |
| 7,472,692 B2 | * | 1/2009 | Nakagawa et al. ........... 123/491 |
| 7,565,238 B2 | * | 7/2009 | Nakagawa et al. ........... 701/113 |
| 7,565,894 B2 | * | 7/2009 | Oda et al. .................... 123/308 |
| 7,664,591 B2 | * | 2/2010 | Nakagawa et al. ........... 701/104 |
| 2006/0144370 A1 | * | 7/2006 | Iihoshi et al. ................ 123/491 |
| 2008/0319636 A1 | * | 12/2008 | Nakagawa et al. ........... 701/104 |

FOREIGN PATENT DOCUMENTS

| JP | 60201042 A | * 10/1985 | ................. 123/492 |
| JP | 2-227526 | 9/1990 | |
| JP | 7-180580 A | 7/1995 | |
| JP | 9-53487 A | 2/1997 | |
| JP | 10-54271 | 2/1998 | |
| JP | 2005-133601 A | 5/2005 | |

OTHER PUBLICATIONS

Japanese Office Action dated May 26, 2009 (Four (4) sheets).

* cited by examiner

*Primary Examiner*—Willis R Wolfe, Jr.
(74) *Attorney, Agent, or Firm*—Crowell & Moring LLP

(57) ABSTRACT

An engine control apparatus for controlling the amount of the air flowing into each cylinder in accordance with the amount of the fuel flowing into the cylinder at the time of starting the engine is disclosed. Further, at the engine starting time, the target amount of the air flowing into the cylinder is calculated and/or the amount of the air flowing into the cylinder is controlled, based on the amount of the fuel flowing into the cylinder. The amount of the fuel remaining in the neighborhood of the engine intake port or in the intake pipe is calculated by being separated into a balanced liquid film amount and unbalanced liquid film amount. Based on the unbalanced liquid film amount, the injection fuel amount is corrected so that the amount of the fuel flowing into the cylinder is controlled with high accuracy.

21 Claims, 32 Drawing Sheets

○ EXECUTE UNTIL LAPSE OF PREDETERMINED TIME
  OR PREDETERMINED CYCLES FROM CRANKING START

○ TEMP PARAMETER INCLUDES:
  .ATMOSPHERIC TEMP
  .INTAKE AIR TEMP
  .ENGINE COOLING WATER TEMP

<EMBODIMENT 1>

<EMBODIMENTS 1 TO 4>

<EMBODIMENTS 1 TO 4>

<EMBODIMENTS 1, 3 TO 4>

<CYLINDER INFLUENT FUEL AMOUNT CALCULATION UNIT>

<EMBODIMENTS 1, 3 TO 4>

<TARGET A/F RATIO CALCULATION UNIT>

FIG. 35
<EMBODIMENT 1>
<TARGET AIR AMOUNT CALCULATION UNIT>
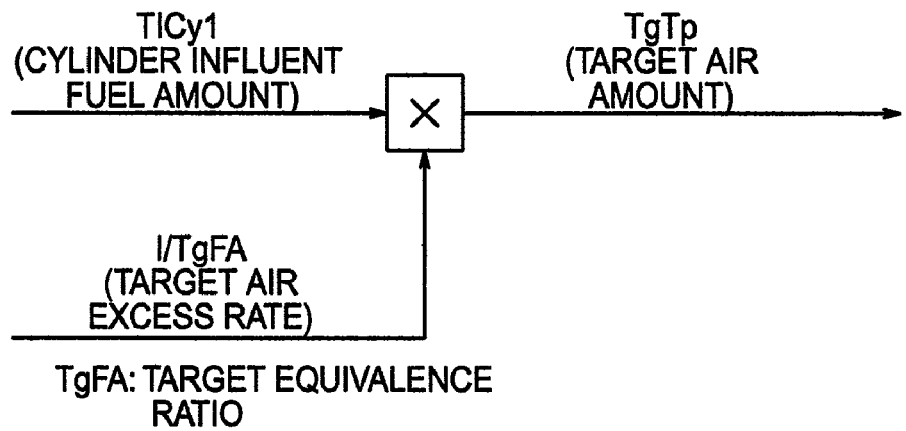
TgFA: TARGET EQUIVALENCE RATIO
FIG. 36
<EMBODIMENTS 1 TO 4>
<TARGET THROTTLE OPENING DEGREE/INTAKE VALVE ON/OFF TIMING CALCULATION UNIT>
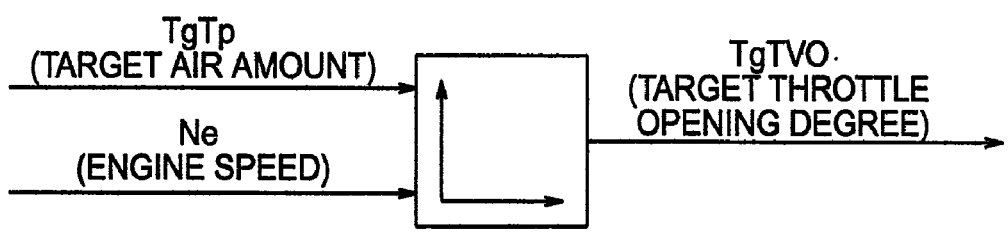
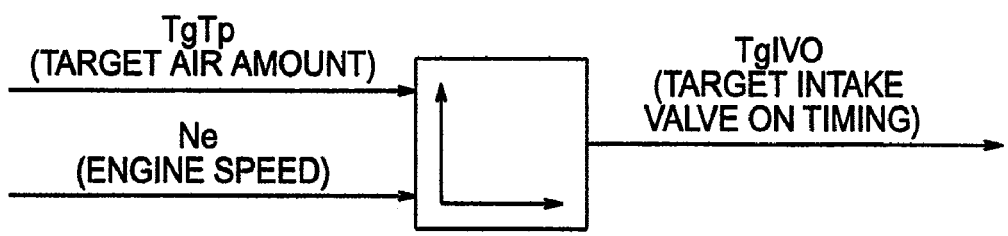
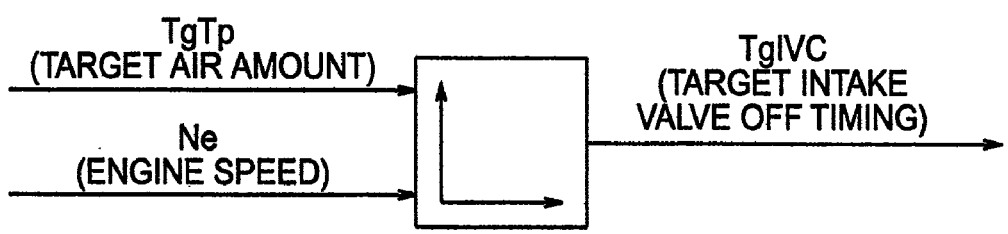

<EMBODIMENT 2>

<TARGET AIR AMOUNT CALCULATION UNIT>

<EMBODIMENT 4>
<TARGET AIR AMOUNT CALCULATION UNIT>

<EMBODIMENT 5>

<EMBODIMENTS 5, 6>

<EMBODIMENT 5>

<FUEL INJECTION AMOUNT CALCULATION UNIT>

<EMBODIMENTS 5, 6>

<TARGET COMBUSTION FUEL AMOUNT CALCULATION UNIT>

<EMBODIMENT 5>

<BALANCED LIQUID FILM AMOUNT CALCULATION UNIT>

<EMBODIMENTS 5, 6>

<UNBALANCED LIQUID FILM AMOUNT CALCULATION UNIT>

<EMBODIMENT 6>

<EMBODIMENT 6>

<BALANCED LIQUID FILM AMOUNT CALCULATION UNIT>

ENGINE CONTROL APPARATUS

BACKGROUND OF THE INVENTION

This invention relates to an engine control apparatus, or more in particular, to a control apparatus for reducing the emission gas at the time of starting the engine.

With the recent strengthened control of the emission gas of the automotive vehicle engine in North America, Europe and Japan, a further reduction in engine emission gas has been required. The catalyst performance has been improved and the accuracy of catalyst control has been increased to such an extent that the greater amount of the emission gas from the engine is discharged at the time of starting. The emission performance depends to a large measure on the air-fuel ratio in the cylinder, and therefore, the optimization of the air-fuel ratio in the cylinder at the time of starting the engine is the most important subject.

JP-A-2-227526 discloses an invention wherein in order to properly control the air-fuel ratio of the engine started at a very low temperature, the fuel injection amount (target air-fuel ratio) is set to the richer side than normal, and after starting, shifted gradually to the lean side and returned to the normal air-fuel ratio.

In the engine for injecting the fuel through the intake port, the amount of the fuel injected and flowing into the cylinder is known to change in accordance with the engine temperature and the intake air temperature at the time of starting. Especially, with the decrease in temperature, the amount of the fuel flowing into the cylinder decreases, and therefore, the air-fuel ratio in the cylinder becomes more difficult to optimize.

With the decrease in temperature, the amount of the injected fuel which flows into the cylinder decreases. Especially at a very low temperature below the freezing point, the flow rate into the cylinder is extremely reduced. The amount of air flowing into the cylinder, on the other hand, undergoes substantially no change. Rather, the air density increases with the decrease in temperature, often resulting in a higher efficiency of filling up the air in the cylinder. According to the invention cited above, therefore, a greater amount of fuel is required to be injected to optimize the air-fuel ratio at the time of starting the engine at a low temperature. The injection of a greater amount of fuel, however, leaves a great amount of fuel in the intake pipe, and the fuel remaining in the intake pipe gradually flows into the cylinder after starting, thereby deteriorating the air-fuel ratio controllability. The amount of the fuel that can be injected by the injector (fuel injection valve) per cycle is limited by the dynamic range of the injector and the engine stroke (since the engine is rotated by cranking, the period during which the fuel can be injected is limited). Especially at a very low temperature, therefore, the fuel cannot be supplied in an amount commensurate with the amount of the air flowing into the cylinder.

For the reason described above, the optimization of the air-fuel ratio at the time of starting the fuel injection as intended by the cited invention is limited at a very low temperature.

JP-A-10-54271, on the other hand, discloses the invention of a fuel injection control apparatus for injecting the fuel in accordance with the timing of the intake stroke, wherein the fuel injection amount (target air-fuel ratio) for the first fuel injection session is set separately from the fuel injection amount for the second and subsequent fuel injection sessions.

In the engine for injecting the fuel into the intake port, the amount of the fuel injected into the intake pipe which flows into the cylinder is known to change in accordance with the engine temperature at the time of starting, the intake air temperature or the fuel property. In order to optimize the air-fuel ratio in the cylinder, the fuel is required to be controlled highly accurately taking the fuel behavior at the time of starting into consideration.

In the invention cited above, the effect of the attached fuel is taken into consideration only for the first injection session. The change in the amount of the attached fuel which may occur after the first injection session, therefore, is not taken into consideration, with the result that the amount of the fuel flowing into the cylinder develops an error. Once the amount of the fuel flowing into the cylinder develops an error, the air-fuel ratio for combustion becomes erroneous and the emission is deteriorated. The mechanism and the factors for determining the amount of the attached fuel are yet to be made apparent. In spite of the known fact that the amount of the attached fuel has some effect, therefore, the accuracy of the fuel control operation taking the amount of the attached fuel into consideration is still not considered sufficiently high.

Also, the cited invention presupposes the fuel injection in accordance with the intake stroke. The fuel injected at the intake stroke, however, is liable to flow directly into the cylinder without being temporarily formed into a liquid film on the surface of the inner wall of the intake pipe or the surface of the intake valve. In such a case, the shearing stress of the intake air velocity cannot be fully utilized, and therefore, the fuel enters the cylinder without being sufficiently pulverized. The resulting larger particle size of the fuel deteriorates the combustion characteristic, thereby adversely affecting both the torque performance and the emission performance.

SUMMARY OF THE INVENTION

In view of the situation described above, an embodiment of this invention proposes an engine control apparatus capable of optimizing the air-fuel ratio especially in starting the engine even at a low temperature. Another embodiment of the invention proposes an engine control method for highly accurately predicting the fuel behavior at the starting time and positively controlling the fuel amount in the intake pipe thereby to control the amount of the fuel flowing into the cylinder with higher accuracy and thus reduce the exhaust gas.

According to claim 1, as shown in FIG. 1, there is provided an engine control apparatus comprising a means for calculating the target amount of the air flowing into the cylinder and/or controlling the amount of the air flowing into the cylinder based on (in accordance with) the amount of the fuel flowing into the cylinder.

Specifically, as described above, the amount of the fuel flowing into the cylinder is extremely reduced and the air-fuel ratio cannot be optimized simply by controlling the amount of the fuel upward at a very low temperature. In accordance with the reduction in the amount of the fuel flowing into the cylinder, therefore, the amount of the air flowing into the cylinder is controlled downward. This control operation is accomplished by a means for calculating the target amount of the air flowing into the cylinder and/or controlling the amount of the air flowing into the cylinder.

According to claim 2, as shown in FIG. 2, there is provided an engine control apparatus comprising a means for calculating the target amount of the air flowing into the cylinder and/or controlling the amount of the air flowing into the cylinder in accordance with the temperature parameter correlated with the engine temperature or the fuel temperature.

Specifically, the amount of the fuel flowing into the cylinder is known to decrease in accordance with the decrease in fuel temperature. In view of this, the amount of the air flowing into the cylinder is controlled in accordance with the temperature parameter correlated with the engine temperature or the fuel temperature. More specifically, as explained with reference to claim 5 later, the amount of the air flowing into the cylinder is controlled downward in accordance with the decrease in the engine temperature or the fuel temperature. This control operation is accomplished by a means for calculating the target amount of the air flowing into the cylinder and/or controlling the amount of the air flowing into the cylinder.

According to claim 3 based on claim 2, as shown in FIG. 2, there is provided an engine control apparatus comprising a means for controlling the amount of the air flowing into the cylinder in accordance with the temperature parameter correlated with the engine temperature or the fuel temperature before lapse of a predetermined time or predetermined cycles after starting the cranking at the time of starting the engine.

Specifically, in view of the fact that the amount of the fuel flowing into the cylinder is extremely reduced only in the initial period of starting the engine at a very low temperature, this claim expressly states that the invention is applied only to the particular period.

According to claim 4 based on claim 2, as shown in FIG. 2, there is provided an engine control apparatus wherein the temperature parameter correlated to the engine temperature or the fuel temperature is at least one of the atmospheric temperature, the intake air temperature and the engine cooling water temperature.

Specifically, this claim expressly states that any one of the practical values of the atmospheric temperature, the intake air temperature and the engine cooling water temperature is used as a temperature parameter correlated to the engine temperature or the fuel temperature.

According to claim 5 based on claim 2, there is provided an engine control apparatus wherein the amount of the air flowing into the cylinder is controlled downward in accordance with the decrease in the temperature parameter correlated to the engine temperature or the fuel temperature.

Specifically, as explained with reference to claim 2, the amount of the fuel flowing into the cylinder is known to decrease with the decrease in fuel temperature. In accordance with the decrease in fuel temperature, therefore, the amount of the air flowing into the cylinder is controlled downward. This control operation is accomplished by a means for calculating the target amount of the air flowing into the cylinder and/or controlling the amount of the air flowing into the cylinder.

According to claim 6 based on claim 2, there is provided an engine control apparatus wherein the air flowing into the cylinder is controlled to the minimum amount in the case where the temperature parameter correlated to the engine temperature or the fuel temperature is not higher than a predetermined value.

Specifically, as described above, the amount of the fuel that can be injected by the injector (fuel injection valve) per cycle is limited by the dynamic range of the injector and the engine stroke (the engine is rotated by cranking, and therefore, the period during which the fuel can be injected is limited). Even in the case where the fuel is injected in maximum amount injectable per cycle, the amount (rate) of the fuel flowing into the cylinder decreases with the temperature decrease. Therefore, the amount of the air is reduced correspondingly to maintain the optimum air-fuel ratio as explained with reference to claims 1 to 5. With the decrease in the air amount, however, though the air-fuel ratio is maintained at optimum level, the torque generated is correspondingly reduced. In the case where the amount of the air is reduced with the decrease in the amount of the fuel flowing into the cylinder, the air amount may be reduced sooner or later to a level incapable of generating the torque required for starting. This claim expressly states that in such a case, the combustion (torque) is not generated for the particular cycle, and the amount of the air flowing into the cylinder is reduced as far as possible so that the unburned fuel may not be discharged into the exhaust pipe.

According to claim 7 based on claim 2, there is provided an engine control apparatus wherein the fuel flowing into the cylinder is controlled to the minimum amount in the case where the temperature parameter correlated to the engine temperature or the fuel temperature is not higher than a predetermined value.

Specifically, this claim corresponds to the situation described in claim 6. Claim 8 proposes, however, that the amount of the air flowing into the cylinder is minimized not to discharge the unburned fuel into the exhaust pipe by giving up the combustion in the particular cycle in the case where the amount of the fuel flowing into the cylinder is so small as to be incapable of maintaining the combustion (torque). To minimize the air amount, however, the internal pressure of the cylinder is required to be reduced further, in which case the flow velocity in the intake valve is increased at the time of the intake operation, and the a greater amount of fuel may be introduced into the cylinder by the energy of the flow velocity. This poses no problem as long as the fuel introduced has a sufficient amount for combustion. In the case where the fuel is still short of the amount for combustion, however, the corresponding amount of the unburned fuel is discharged and deteriorates the emission. The operation to control the amount of the air to minimum, therefore, is not sometimes an optimal choice, and therefore, the air amount control operation to minimize the fuel flowing into the cylinder is proposed.

According to claim 8 based on claim 1, there is provided an engine control apparatus wherein the means for controlling the amount of the air in the cylinder is a throttle valve and/or a variable valve.

The throttle valve arranged in the intake pipe is generally used as a means for controlling the amount of the air in the cylinder. The variable valve is more advantageous, however, for controlling the air amount for each cylinder more accurately.

According to claim 9 based on claim 8, there is provided an engine control apparatus wherein the means for controlling the amount of the air in the cylinder has a supercharger.

Specifically, the supercharger is used, if required, to supply a greater amount of the air at the time of engine start. In this case, however, the supercharge operation is required to be possible from the time of starting.

According to claim 10 based on claim 2, there is provided an engine control apparatus comprising a variable valve capable of controlling the lift, wherein the lift of the intake valve and/or the exhaust valve is minimized or reduced to 0 before lapse of a predetermined time or predetermined cycles after start of cranking in the case where the temperature parameter correlated to the engine temperature or the fuel temperature is not higher than a predetermined value.

Specifically, this claim corresponds to the situation described in claim 6. Claim 6 proposes that in the case where the amount of the fuel flowing into the cylinder is reduced to such an extent that the combustion (torque) cannot be maintained, the combustion in the particular cycle is given up and the amount of the air flowing into the cylinder is reduced as far as possible not to discharge the unburned fuel into the exhaust pipe. Especially, in the case where the apparatus has a variable valve with a controllable lift, the amount of the air flowing into the cylinder can be minimized, for example, by setting the lift of the intake valve to zero. As an alternative, as long as the lift of the exhaust valve is set to zero, the fuel may flow into the cylinder but is not discharged into the exhaust pipe.

According to claim 11 based on claim 1, as shown in FIG. 3, there is provided an engine control apparatus comprising a means for predictively calculating the amount of the fuel actually flowing into the cylinder and a means for calculating the target in-cylinder air amount and/or the target in-cylinder air-fuel ratio based on the predicted amount of the fuel actually flowing into the cylinder (hereinafter sometimes referred to as the "predicted actual cylinder influent fuel amount").

Specifically, this claim corresponds to claim 1, and adds the "means for predictively calculating" the "amount of the fuel flowing into the cylinder" to the configuration of claim 1.

According to claim 12 based on claim 11, as shown in FIG. 4, there is provided an engine control apparatus comprising a means for calculating the target in-cylinder air amount based on the "predicted actual cylinder influent fuel amount" and the "target in-cylinder air-fuel ratio".

Specifically, the proper "target in-cylinder air amount" to realize the target air-fuel ratio is calculated from the "predicted actual cylinder influent fuel amount" and the "target in-cylinder air-fuel ratio".

According to claim 13 based on claim 12, as shown in FIG. 5, there is provided an engine control apparatus comprising a means for calculating the target amount of the fuel flowing into the cylinder (hereinafter sometimes referred to as the "target cylinder influent fuel amount") and a means for correcting the engine intake air amount, the air-fuel ratio or the fuel injection amount based on the difference between the "target cylinder influent fuel amount" and the "actual predicted cylinder influent fuel amount".

In the case where the amount of the air in the cylinder is not controlled at the time of engine start (in which case the filling efficiency generally reaches a maximum), the combustion fuel amount originally required for starting the engine is assumed equal to be the "target cylinder influent fuel amount". Actually, however, as described above, a part (or a major part) of the injected fuel amount remains in the intake pipe. In view of this, the "target cylinder influent fuel amount" is compared with the "predicted actual cylinder influent fuel amount", and if there is any difference between them, the engine intake air amount, the air-fuel ratio and the fuel injection amount are appropriately corrected.

According to claim 14 based on claim 13, as shown in FIG. 6, there is provided an engine control apparatus wherein in the case where the "target cylinder influent fuel amount" is larger than the "predicted actual cylinder influent fuel amount", the in-cylinder air amount or the in-cylinder air-fuel ratio is corrected downward.

Specifically, this claim corresponds to claim 13. More specifically, in the case where the "target cylinder influent fuel amount" is larger than the "predicted actual cylinder influent fuel amount", i.e. in the case where the actual cylinder influent fuel amount fails to reach the originally required combustion fuel amount, the in-cylinder air-fuel ratio is larger than the initial value (turns lean), and therefore, corrected by reducing the amount of the air or the air-fuel ratio in the cylinder.

According to claim 15 based on claim 13, as shown in FIG. 8, there is provided an engine control apparatus wherein in the case where the "target in-cylinder influent fuel amount" is smaller than the "predicted actual cylinder influent fuel amount", on the other hand, the amount of the fuel in the cylinder is corrected downward.

Specifically, this claim corresponds to claim 13. More specifically, in the case where the "target cylinder influent fuel amount" is smaller than the "predicted actual cylinder influent fuel amount", i.e. in the case where the actual cylinder influent fuel amount is larger than the originally required combustion fuel amount, the in-cylinder air-fuel ratio is smaller than the initial value (turns rich), and therefore, corrected by reducing the amount of the fuel in the cylinder. According to this claim, the proper air-fuel ratio is achieved from the rich state by reducing the fuel amount in the cylinder. This is by reason of the fact that at the time of engine start, the filling efficiency is generally maximum, and therefore, the air amount cannot be increased. As far as the engine can be supercharged from the start as described in claim 9, however, the requirement can be met by increasing the air amount.

According to claim 16 based on claim 12, as shown in FIG. 8, there is provided an engine control apparatus wherein in the case where the "predicted actual cylinder influent fuel amount" is smaller than a predetermined value, the air in the cylinder is controlled to the minimum amount.

This claim corresponds to claim 6. Specifically, as described above, the amount of the fuel that can be injected by the injector (fuel injection valve) per cycle is limited by the dynamic range of the injector and the engine stroke (since the engine is rotated by cranking, the period during which the fuel can be injected is limited). Even in the case where the fuel is injected in maximum amount injectable per cycle, the amount (rate) of the fuel flowing into the cylinder decreases with temperature. The optimum air-fuel ratio is maintained, therefore, by reducing the air amount correspondingly. With the decrease in the air amount, however, though the optimum air-fuel ratio is maintained, a lesser torque is generated. The air amount, if decreased with the amount of the fuel flowing into the cylinder, may sooner or later reach a level so low that the torque that can start the engine cannot be generated. This claim expressly states that in such a case, no combustion (torque) is generated in the particular cycle, but the amount of the air flowing into the cylinder is reduced as far as possible not to discharge the unburned fuel into the exhaust pipe. The "predetermined value" in claim 16, therefore, indicates the fuel amount equivalent to the level where the combustion (torque) can be generated.

According to claim 17 based on claim 11, as shown in FIG. 9, there is provided an engine control apparatus wherein the "actual cylinder influent fuel amount prediction means" determines the "predicted actual cylinder influent fuel amount" from at least the "injected fuel amount" and the "intake pipe fuel amount remainder", i.e. the fuel amount remaining in the intake pipe.

As described with reference to claim 13, a part (or a major part) of the injected fuel amount remains in the intake pipe. Thus, this claim expressly states that the actual cylinder influent fuel amount is determined from the "injected fuel amount for the particular cycle" and the "fuel amount remaining in the intake pipe for the previous cycle (or before starting)".

According to claim 18 based on claim 17, as shown in FIG. 10, there is provided an engine control apparatus wherein the "actual cylinder influent fuel amount prediction means" includes a means for determining the "total intake pipe fuel amount remainder", i.e. the total amount of the fuel remaining in the intake pipe, which is the sum of the "injected fuel amount" and the "intake pipe fuel amount remainder" and a means for calculating the "actual cylinder influent fuel amount" based on the "total intake pipe fuel amount remainder".

Specifically, this claim corresponds to claim 17, and expressly states that the "actual cylinder influent fuel amount" is determined from the sum of the "injected fuel amount" and the "intake pipe fuel amount remainder".

According to claim 19 based on claim 1, there is provided an engine control apparatus wherein the fuel injection is started before the intake valve is opened.

Specifically, in the case where the fuel injection is continued even after the intake valve opens, the injected fuel is liable to flow into the cylinder directly. In this case, the shearing stress of the intake flow velocity cannot fully utilized, and therefore, the fuel enters the cylinder without being sufficiently pulverized. The resulting large fuel particle size would deteriorate the combustion characteristic and adversely affect both the torque performance and the emission performance. In view of this, this claim specifies the start of fuel injection at latest before the intake valve opens.

According to claim 20 based on claim 1, there is provided an engine control apparatus wherein the fuel injection is finished before the intake valve opens.

This claim corresponds to claim 19. Specifically, and as explained with reference to claim 19, it is not desirable to inject the fuel while the intake valve opens from the viewpoint of both the torque performance and the emission performance. Thus, this claim expressly states that the fuel injection should ideally be finished before the intake valve opens.

According to claim 21, there is provided an automotive vehicle with the control apparatus mounted thereon as described in claim 1.

As described above, according to this invention, the air amount in the cylinder is controlled in accordance with the amount of the fuel flowing into the cylinder. Even in the case where the amount of the fuel flowing into the cylinder is extremely reduced as at the time of starting the engine in a low temperature environment, therefore, the corresponding operation of controlling the air amount in the cylinder always optimizes the air-fuel ratio in the cylinder, thereby reducing the exhaust gas at the time of starting the engine.

According to the embodiments of the invention as described in claims 1 to 20 thereof, the air amount in the cylinder is controlled in accordance with the amount of the fuel flowing into the cylinder, and therefore, even in the case where the amount of the fuel flowing into the cylinder is reduced extremely as at the time of starting in a very low temperature environment, the air-fuel ratio in the cylinder is always optimized, thereby reducing the exhaust gas at the time of engine start.

Next, other embodiments described in claims 21 to 40 are explained.

According to claim 21, as shown in FIG. 11, there is provided an engine control apparatus comprising a means for calculating the amount of the fuel, separated into the fuel amount A and the fuel amount B, remaining in the neighborhood of the intake port or in the intake pipe of the engine.

Specifically, the fuel injected into the intake pipe is provisionally formed into a liquid film on the inner wall of the intake pipe and the surface of the intake valve. The present inventor has discovered that this liquid film is includes "a stable liquid film remaining in the intake pipe (the balanced liquid film as described later)" and "an unstable liquid film taken into the cylinder entirely upon lapse of a sufficient time (sufficient number of cycles) without remaining in the intake pipe (the unbalanced liquid film as described later)". FIG. 33 is the result of measuring the "amount of the stable liquid film (the amount of the balanced liquid film) remaining in the intake pipe in the very early stage of the engine starting time" of the actual engine (the approximation formula is also illustrated; the intake velocity constant). It is understood that the measurement can be arranged in order by the starting cooling water temperature representing the fuel temperature and the fuel property (light or heavy). Also, FIG. 34 shows the result of measurement of the "amount of the unstable liquid film (unbalanced liquid film amount) remaining in the intake pipe in the very early stage of the engine starting time" (the estimated value is also shown). As understood, with the increase in the number of cycles after starting, the unbalanced liquid film amount decreases and approaches zero. The unbalanced liquid film amount thus reduced is considered to have flowed into the cylinder.

This fact is considered to show that in the very early stage of the engine starting period, the fuel liquid film formed in the intake pipe is separated into the dynamically stable balanced liquid film amount and the dynamically unstable unbalanced liquid film amount, and the latter gradually collapses with the lapse of time (number of cycles) and flows into the cylinder. Specifically, the amount of the fuel remaining in the intake pipe and the amount of the fuel flowing into the cylinder, included in the fuel liquid film, are probably determined by the dynamic balance between the fuel liquid film shearing force due to the intake air amount and the viscosity and the friction force of the fuel liquid film. The reason why the balanced liquid film amount can be arranged in order by the temperature and the fuel property in FIG. 33 is considered due to the fact that the fuel viscosity is determined primarily by the temperature and the fuel property. Incidentally, the dynamism is a controlling factor only in the very early stage of the engine starting period low in temperature, and with the lapse of time after starting the engine, the temperature on the surface of the intake valve and the inner wall of the intake pipe increases. Thus, the fuel is evaporated easily, so that the evaporation characteristic has a large effect on the phenomenon as well known. To summarize, in order to accurately control the amount of the fuel flowing into the cylinder at the starting time, the fuel behavior in the intake pipe is required to be handled with high accuracy. Especially, the inventor has found that the amount of the liquid film in the intake pipe includes the dynamically stable balanced liquid film amount and the dynamically unstable unbalanced liquid film amount and that the amount of the fuel flowing into the cylinder can be controlled with high accuracy by detecting and controlling the two amounts. The control apparatus includes a means for calculating by separating the amount of the liquid film in the intake pipe into the balanced liquid film amount and the unbalanced liquid film amount as shown in FIGS. 33, 34.

As shown in FIG. 12, there is provided an engine control apparatus comprising a means for correcting the fuel injection amount based on the fuel amount A or the fuel amount B calculated separately from each other.

Specifically, as described above, the amount of the fuel film in the intake pipe is calculatedly into the balanced liquid film amount and the unbalanced liquid film amount separately from each other, and based on the balanced liquid film amount or the unbalanced liquid film amount, the fuel injection amount is corrected. As described above, the unbalanced liquid film amount gradually collapses with the lapse of time (number of cycles) and flows into the cylinder. Desirably, therefore, shown in FIG. 27, the unbalanced liquid film amount which collapses and flows into the cylinder in each cycle is estimated, and the fuel amount should be corrected downward correspondingly.

As shown in FIG. 13, there is provided an engine control apparatus wherein the "two fuel amounts calculated separately from each other" include the "balanced liquid film amount" providing a stable fuel liquid film and the "unbalanced liquid film amount" providing an unstable fuel liquid film.

Specifically, that the amount of the fuel film in the intake pipe calculated in two amounts separately from each other includes the balanced liquid film amount and the unbalanced liquid film amount.

As shown in FIG. 14, there is provided an engine control apparatus comprising a means for correcting the fuel injection amount based on the "unbalanced liquid film amount".

Specifically, the unbalanced liquid film amount gradually collapses with the lapse of time (number of cycles) and flows into the cylinder. Desirably, therefore, as shown in FIG. 27, the unbalanced liquid film amount which collapses in each cycle and flows into the cylinder should be estimated, and the fuel amount should be corrected downward correspondingly.

As shown in FIG. 15, there is provided an engine control apparatus comprising a means for predictively calculating the amount of the unbalanced liquid film flowing into the cylinder in the next cycle.

As shown in FIG. 16, there is provided an engine control apparatus comprising a means for correcting the fuel injection amount of the next cycle based on the amount of the fuel in the form of the "balanced liquid film" flowing into the cylinder in the next cycle.

As shown in FIG. 17, there is provided an engine control apparatus comprising a means for controlling, by cylinder, the amount of the fuel remaining in the neighborhood of the intake port or in the intake pipe of each cylinder.

Specifically, the fuel injection valve is generally mounted on each cylinder, and therefore, the invention can be implemented for each cylinder. Thus, the amount of the fuel remaining in the intake pipe (the balanced liquid film amount+the unbalanced liquid film amount) of each cylinder can be controlled independently.

There is provided an engine control apparatus wherein the difference (variation) in the amount of the fuel remaining in the neighborhood of the intake port or in the intake pipe of each cylinder between the cylinders upon lapse of predetermined cycles or a predetermined time is controlled in a predetermined range.

Specifically, the amount of the fuel remaining in the intake pipe of each cylinder (the balanced liquid film amount+the unbalanced liquid film amount) can be controlled independently. The amount of the fuel remaining in the intake pipe, if not required to be varied from one cylinder to another, is desirably controlled uniformly for each cylinder.

As shown in FIG. 18, there is provided an engine control apparatus comprising a means for detecting the fuel temperature directly or indirectly, a means for determining the balanced liquid film amount in a predetermined fuel property from the fuel temperature, a means for calculating the target combustion fuel amount and a means for injecting, in the first injection session of the engine start period, the fuel in the amount equal to the sum of the balanced liquid film amount and the target combustion fuel amount into each cylinder.

Specifically, in the case where the amount of the fuel remaining in the intake pipe can be regarded as zero, especially in the first injection session, the amount of the fuel flowing into the cylinder can be controlled as desired by injecting the sum of the balanced liquid film amount and the unbalanced liquid film amount (target cylinder influent fuel amount). Also, the balanced liquid film amount, as shown in FIG. 26, is determined primarily from the "fuel temperature and the fuel property" which in turn determines the viscosity at a constant intake flow velocity. In the case where the actual fuel property is known before starting the engine, the balanced liquid film amount is determined based on the particular fuel property. Otherwise, some fuel property is assumed to determine the balanced liquid film amount. From the viewpoint of securing the robustness of the starting performance, however, the fuel property is desirably initialized on heavy side.

As shown in FIG. 19, there is provided an engine control apparatus comprising a means for updating and calculating the "balanced liquid film amount in a predetermined fuel property from the fuel temperature" (for each cycle), and a means for correcting the fuel injection amount (in the next and subsequent injection sessions) based on the difference between the "previously calculated balanced liquid film amount" and the "presently calculated balanced liquid film amount".

Specifically, as described above, the balanced liquid film amount is dynamically varied depending on the temperature and the fuel property. The dynamic variation in the balanced liquid film amount relatively changes the unbalanced liquid film amount also. The change in the unbalanced liquid film amount, in turn, collapses a part thereof and the amount of the fuel flowing into the cylinder also undergoes a change. In order to optimize the air-fuel ratio in the cylinder, the fuel injection amount is also required to be corrected from time to time correspondingly.

As shown in FIG. 20, there is provided an engine control apparatus comprising a means for updating the "unbalanced liquid film amount" based on the difference between the "previously calculated balanced liquid film amount" and the "presently calculated balanced liquid film amount", and a means for correcting the fuel injection amount (in the next and subsequent injection sessions) based on the "unbalanced liquid film amount".

Specifically, the apparatus even includes the means for updating the unbalanced liquid film amount.

As shown in FIG. 21, there is provided an engine control apparatus comprising a means for determining the various (plural) fuel properties and the corresponding balanced liquid film amount, a means for detecting the actual fuel property directly or indirectly, and a means for determining (switching) the balanced liquid film amount corresponding to the actual fuel property thus detected.

Specifically, in the case where the actual fuel property is known before starting the engine, the balanced liquid film amount is determined based on the particular fuel property. In the case where the actual fuel property is not known so, on the other hand, the balanced liquid film amount is determined based on a some assumed fuel property. In the case where the fuel property can be detected by some means after starting the engine, the balanced liquid film amount is switched in accordance with the particular fuel property.

As as shown in FIG. 22, there is provided an engine control apparatus wherein the fuel temperature detection means detects the fuel temperature based on at least the atmospheric temperature, the engine intake air temperature or the engine cooling water temperature, or uses the atmospheric temperature, the engine intake air temperature or the engine cooling water temperature in place of the fuel temperature.

Specifically, the balanced liquid film amount can be arranged in order by the temperature or the fuel property in FIG. 26 probably by reason of the fact that the viscosity of the fuel is determined primarily by the temperature and the fuel property. In this sense, the fuel temperature is desirably detected directly. From the practical point of view, however, the fuel temperature may be estimated from the temperature parameter correlated with the fuel temperature, such as the atmospheric temperature, the engine intake air temperature or the engine cooling water temperature. Alternatively, the atmospheric temperature, the engine intake air temperature or the engine cooling water temperature may be used as it is without estimating the fuel temperature.

As shown in FIG. 23, there is provided an engine control apparatus comprising a means for detecting the engine combustion air-fuel ratio directly or indirectly, wherein the fuel property is detected based on the combustion air-fuel ratio.

Specifically, as long as the actual fuel property is known before starting the engine, the balanced liquid film amount is determined based on the particular fuel property. In the case where the actual fuel property is unknown, on the other hand, the balanced liquid film amount is determined from some assumed fuel property. The fuel property is detected based on the combustion air-fuel ratio of the engine after starting. As to the fuel of heavy property, for example, the fuel evaporation rate is correspondingly low, and therefore, the air-fuel ratio is larger than the target air-fuel ratio (on lean side). By detecting this, the fuel property can be detected indirectly.

As shown in FIG. 24, there is provided an engine control apparatus comprising a means for detecting the in-cylinder pressure, the axial torque or the emission air-fuel ratio of the engine directly or indirectly, wherein the combustion air-fuel ratio is detected based on the amount of the fuel and the air supplied to the engine, and the in-cylinder pressure, the axial torque or the emission air-fuel ratio.

Specifically, the apparatus is intended to determine the combustion air-fuel ratio indirectly from the in-cylinder pressure, the axial torque or the emission air-fuel ratio of the engine. As long as the fuel has a predetermined property, a realizable combustion air-fuel ratio is determined from the fuel amount and the air amount, while the actual combustion air-fuel ratio is determined from the in-cylinder pressure, the axial torque or the emission air-fuel ratio of the engine. Then, from the difference between these two air-fuel ratios, the fuel property is estimated. Incidentally, the in-cylinder pressure and the torque are decreased according as the combustion air-fuel ratio turns lean.

As shown in FIG. 25, there is provided an engine control apparatus comprising a means for detecting the engine speed change directly or indirectly, wherein the combustion air-fuel ratio is detected based on the amount of the fuel and the air supplied to the engine and the engine speed change.

Specifically, the apparatus is intended to determine the combustion air-fuel ratio indirectly from the engine speed change. As long as the fuel has a predetermined property, a realizable combustion air-fuel ratio is determined from the fuel amount and the air amount, while the actual combustion air-fuel ratio is determined from the engine speed change. Then, from the difference between these two air-fuel ratios, the fuel property is estimated. Incidentally, the engine speed change increases according as the combustion air-fuel ratio turns lean.

In the following, further embodiments are exemplified as items 37 to 44.

In item 37 there is provided an engine control apparatus wherein the "balanced liquid film amount for a predetermined fuel property at the time of starting the engine" is defined as the "balanced liquid film amount for the heavy fuel".

Specifically, in the case where the actual fuel property is known before starting the engine, the balanced liquid film amount is determined based on the particular fuel property. In the case where the actual fuel property is not known, on the other hand, the balanced liquid film amount is determined based on some assumed fuel property. From the viewpoint of the robustness of the starting performance, the fuel property is desirably initialized on heavy side.

In item 38 based on item 37, there is provided an engine control apparatus wherein the "heavy fuel" is defined as at least a fuel heavier than the fuel used for the emission verification test.

This item corresponds to item 37, and specifically and expressly describes the fuel property to be initialized.

In item 39 there is provided an engine control apparatus wherein the "balanced liquid film amount for a predetermined fuel property" is set in such a manner as to increase with the decrease in the "atmospheric temperature, the engine intake air temperature or the engine cooling water temperature".

Specifically, the balanced liquid film amount can be arranged in order by the temperature or the fuel property in FIG. 26 is probably by the reason of the fact that the viscosity of the fuel is determined primarily by the temperature and the fuel property. The viscosity increases with the decrease in temperature. Therefore, the "balanced liquid film amount" is set to increase with the decrease in the "atmospheric temperature, the engine intake air temperature or the engine cooling water temperature".

In item 40 based on item 39, there is provided an engine control apparatus wherein the "balanced liquid film amount" is expressed as the Exp function or the corresponding tendency with respect to the "atmospheric temperature, the engine intake air temperature or the engine cooling water temperature".

Specifically, the viscosity increases with the decrease in temperature. More specifically, that the viscosity is known to be expressed by the Exp function of the fuel temperature (experimental formula).

In item 41, the "balanced liquid film amount" proposes an engine control apparatus comprising means for carrying out compensation in accordance with speed of engine intake air or its correlated parameter.

That is, the amount of the fuel remaining in the intake pipe and the amount of the fuel flowing into the cylinder, included in the fuel liquid film, are probably determined by the dynamic balance between the fuel liquid film shearing force due to the intake air amount and the viscosity and the friction force of the fuel liquid film. Therefore, in this specific example, it is intended to clarify that the dynamic balance of the fuel liquid film is determined (compensated) taking into consideration of effect of shearing force due to the intake air.

In item 42 it is proposed an engine control apparatus equipped with each cylinder.

In item 43 there is proposed an engine control apparatus wherein fuel injection is started before the air intake valve is opened. That is, as has been already, mentioned in previously, as in the prior art, if the fuel injection is carried out in conformity with air intake processes, then the injected fuel is easily flowing into inside the cylinder directly without rendering into balanced liquid film once at air intake pipe inner wall and the surface of air intake valve. In this case, since shearing stress of flow speed of intake air can not be utilized sufficiently, the fuel grain refinement is not sufficiently established to be entered into the cylinder. If the fuel grain size is large, then combustion feature goes bad, and affects both torque performance and exhaust performance. Accordingly in this invention, the fuel injection has to be started at least before opening the air intake valve, utilizing shearing stress of the intake air flow sufficiently, and to propose accelerating fuel grain refinement.

In item 44, it is proposed an engine control apparatus, wherein fuel injection is terminated before the air intake valve is opened. Accordingly, in item 43, though it is proposed to start fuel injection before the air intake valve is opened, more preferably, it is recommended to terminate fuel injection before the air intake valve is opened and to open the air intake valve under condition where fuel liquid film is formulated. In the item 44, this feature is clarified.

As described above, in reference to items 37 to 44, the amount of the fuel remaining in the neighborhood of the intake port or in the intake pipe of the engine is calculated by being separated into the balanced liquid film amount and the unbalanced liquid film amount in terms of the character thereof. The balanced liquid film amount can be determined with higher accuracy by estimation from the fuel property and the fuel temperature (or the temperature correlated thereto). Further, the injection fuel amount is corrected and the amount of the fuel flowing into the cylinder is controlled with high accuracy based on the unbalanced liquid film amount (or the amount of a part of the unbalanced liquid film gradually flowing into the cylinder). Also, the liquid film fuel is pulverized taking full advantage of the shearing stress due to the intake air flow and then flows into the cylinder. As a result, the in-cylinder combustion air-fuel ratio at the time of starting the engine can be controlled with higher accuracy, thereby reducing the emission at the time of engine start.

Also, according to this invention, the amount of the fuel remaining in the neighborhood of the intake port or in the intake pipe of the engine is calculated by being separated into the balanced liquid film amount and the unbalanced liquid film amount. The balanced liquid film amount is determined from the fuel property and the fuel temperature (or the temperature correlated thereto), thereby making it possible to estimate the balanced liquid film amount with higher accuracy. Further, the injection fuel amount is corrected and the amount of the fuel flowing into the cylinder is controlled with higher accuracy based on the unbalanced liquid film amount. As a result, the in-cylinder combustion air-fuel ratio at the time of starting the engine is controlled more accurately, thereby reducing the emission at the time of starting the engine.

Other objects, features and advantages of the invention will become apparent from the following description of the embodiments of the invention taken in conjunction with the accompanying drawings.

BRIEF DESCRIPTION OF THE DRAWINGS

FIG. 35 is a block diagram showing the target air amount calculation unit according to the first embodiment.

FIG. 36 is a block diagram showing the target throttle opening degree and the intake valve on/off timing calculation unit according to the first to fourth embodiments.

DESCRIPTION OF THE EMBODIMENTS

First Embodiment

Figure 28:
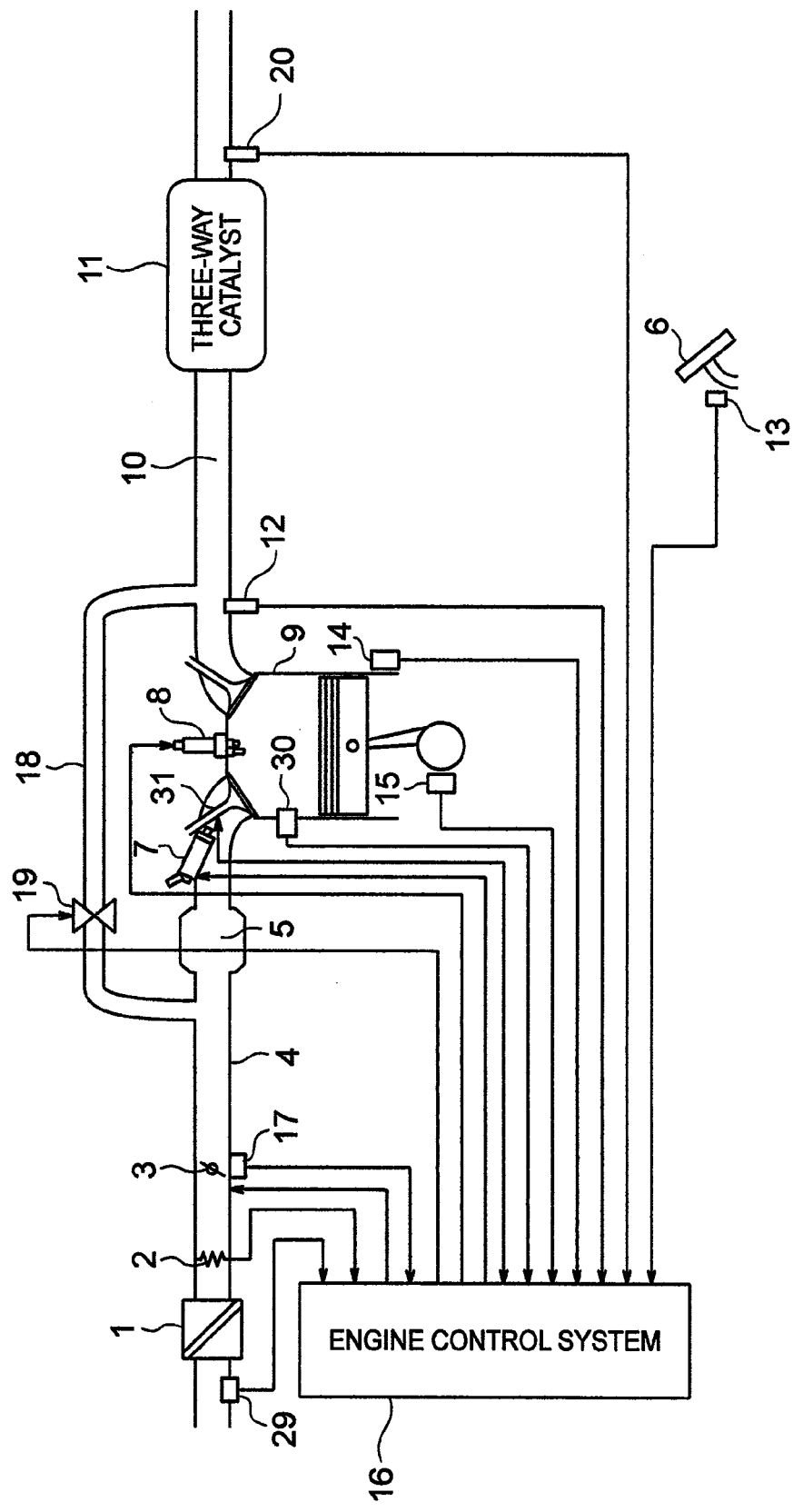
FIG. 28 is a diagram showing an engine control system according to first to fourth embodiments.

FIG. 28 is a system diagram showing this embodiment. In an engine 9 configured of multiple cylinders, the air from an external source is passed through an air cleaner 1, and through an intake manifold 4 and a collector 5, flows into the cylinder. The amount of the influent air is adjusted by an electronic throttle 3, and the influent air amount is detected by an air flow sensor 2. An engine speed sensor 15 outputs the signals for each crankshaft rotation angle 1° and each combustion period. A water temperature sensor 14 detects the engine cooling water temperature. Also, an accelerator pedal angle sensor 13 detects the pedal angle of the accelerator 6 thereby to detect the torque required by the driver. The signals of the accelerator pedal angle sensor 13, the air flow sensor 2, the throttle opening degree sensor 17 mounted on the electronic throttle 3, the engine speed sensor 15 and the water temperature sensor 14 are sent to a control unit 16. From the outputs of these sensors, the running condition of the engine is obtained thereby to optimally calculate the main engine operation amounts including the air amount, the fuel injection amount and the ignition timing. The fuel injection amount calculated in the control unit 16 is converted into a valve open pulse signal and sent to the fuel injection valve 7. Also, a drive signal is sent to a spark plug 8 in such a manner as to be ignited at the ignition timing calculated by the control unit 16. The fuel thus injected is mixed with the air from the intake manifold, and flowing into the cylinder of the engine 9, forms a mixture gas. A variable air intake valve 31 is a dynamic variable valve capable of controlling the valve open timing and the valve close timing. The mixed air is detonated by the spark generated from the spark plug 8 at a predetermined ignition timing, and the resulting combustion pressure pushes down the piston to constitute the engine power. The exhaust gas after detonation is sent into a three-way catalyst 11 through an emission pipe 10. Part of the exhaust gas is recirculated to the intake side through an emission recirculation pipe 18, and controlled by an emission recirculation amount adjust valve 19. An A/F sensor 12 is mounted between the engine 9 and the three-way catalyst 11 and has the linear output characteristic with respect to the oxygen concentration of the exhaust gas. The relation between the oxygen concentration of the exhaust gas and the air-fuel ratio is substantially linear, and therefore, the air-fuel ratio can be determined by the A/F sensor 12 for detecting the oxygen concentration. The control unit 16 calculates the air-fuel ratio on the upstream side of the three-way catalyst 11 from the signal of the A/F sensor 12, and determines by calculation from the signal of the $O_2$ sensor 20 downstream of the catalyst whether the air-fuel ratio is rich or lean with respect to the $O_2$ concentration or the stoichiometric air-fuel ratio on the downstream side of the three-way catalyst. Also, the control unit 16 performs the F/B control operation for correcting the fuel injection amount or the air amount, as required, to optimize the purification efficiency of the three-way catalyst 11 using the output of the A/F sensor 12 and the $O_2$ sensor 20. Further, the intake air temperature sensor 29 detects the intake air temperature, and the in-cylinder pressure sensor 30 the pressure in the cylinder.

Figure 29:
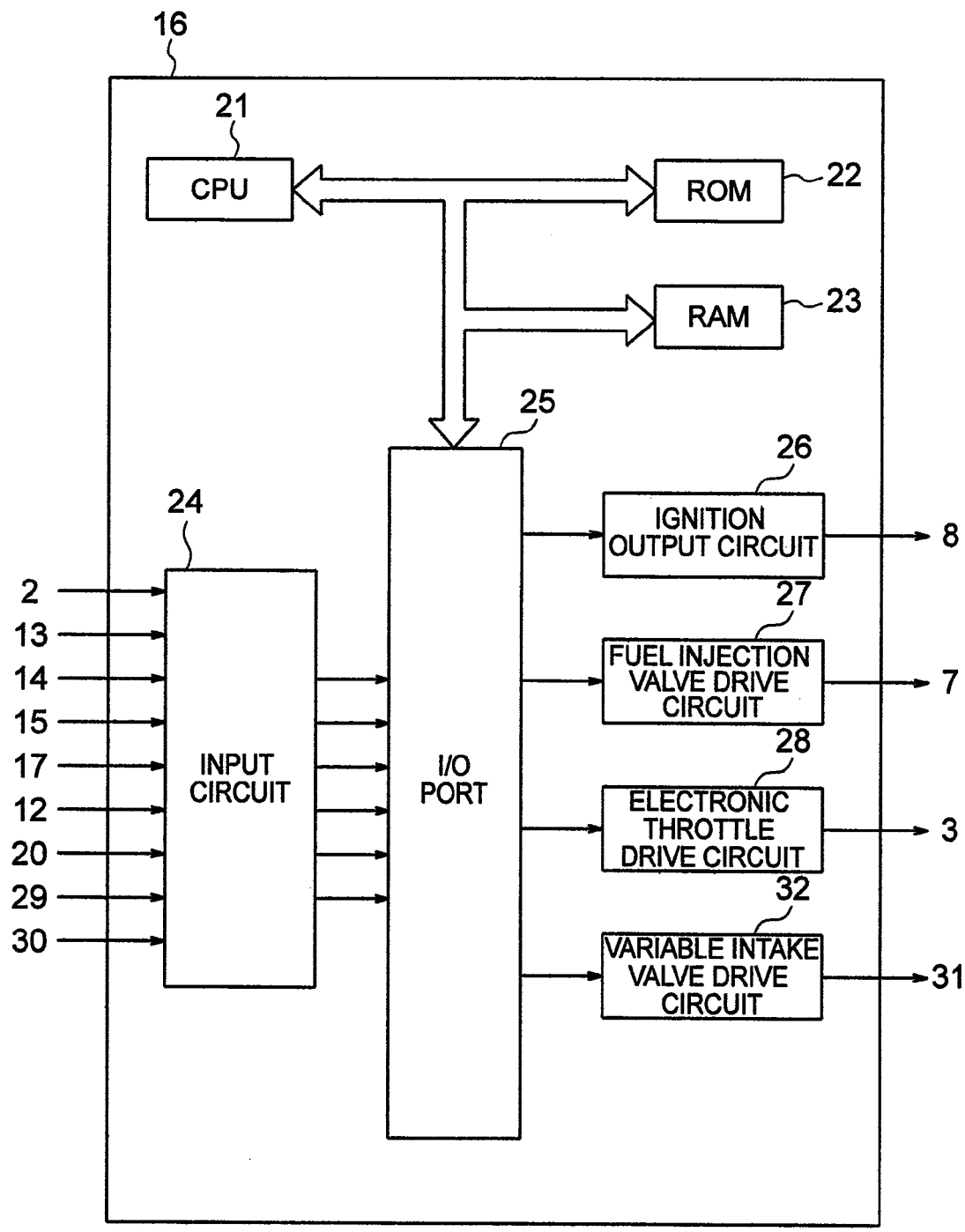
FIG. 29 is a diagram showing the internal configuration of the control unit according to the first to fourth embodiments.

FIG. 29 shows the internal configuration of the control unit 16. The ECU 16 is supplied with the output values of the A/F sensor 12, the throttle opening degree sensor 17, the air flow sensor 2, the engine speed sensor 15, the water temperature sensor 14, the acceleration pedal angle sensor 13, the catalyst-downstream $O_2$ sensor 20, the intake air temperature sensor 29 and the in-cylinder pressure sensor 30. These signals, after being processed by the input circuit 24 to remove the noises, are sent to the input/output port 25. The value of the input port is held in the RAM 23, and arithmetically processed in the CPU 21. The control program describing the contents of the arithmetic operation is written beforehand in the ROM 22. The value indicating each actuator operation amount calculated in accordance with the control program, after being held in the RAM 23, is sent to the output port 25. The spark plug operation signal is set as an on/off signal to turn on by the energization of the primary coil in the ignition output circuit and turn off by the deenergization thereof. The ignition timing is when the signal turns off from on state. The spark plug signal set in the output port is amplified to a sufficiently large energy for combustion by the ignition output circuit 26 and supplied to the spark plug. The drive signal for the fuel injection valve, on the other hand, is set as an on/off signal to turn on when the valve is open and off when the valve is closed, and after being amplified by the fuel injection valve drive circuit 27 to a sufficiently large energy to open the fuel injection valve, sent to the fuel injection valve 7. The drive signal for realizing the target opening degree of the electronic throttle 3 is sent to the electronic throttle 3 through the electronic throttle drive circuit 28. The drive signal for realizing the open timing and the close timing of the variable intake valve 31, on the other hand, is sent to the variable intake valve 31 through the drive circuit 32. Now, the control program written in the ROM 22 is explained.

Figure 30:
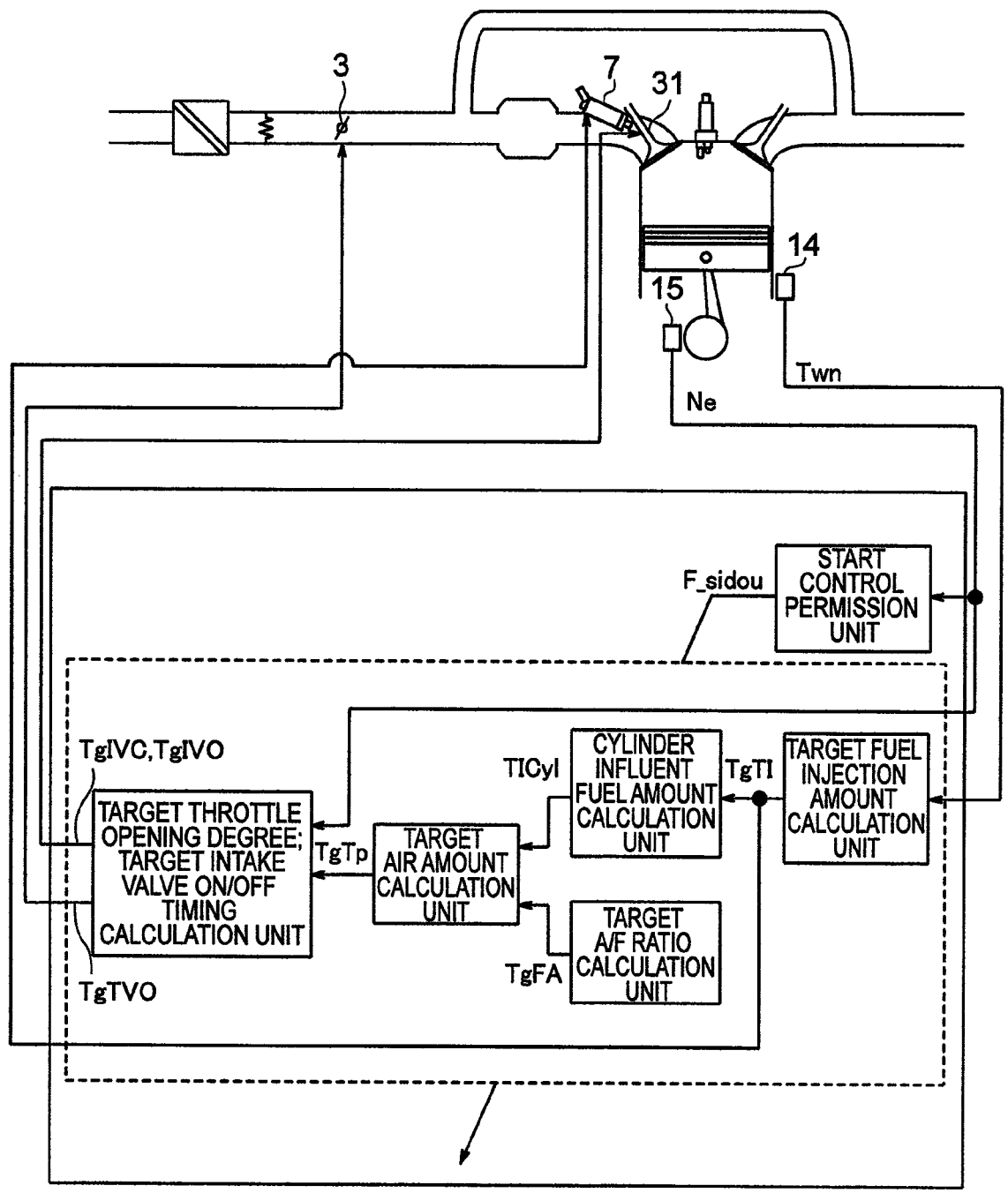
FIG. 30 is a block diagram showing the control system as a whole according to the first embodiment.

FIG. 30 is a block diagram showing the control system as a whole configured of the calculation units described below.
.Starting control permission unit (FIG. 31)
.Target fuel injection amount calculation unit (FIG. 32)
.Cylinder influent fuel injection amount calculation unit (FIG. 33)
.Target air-fuel ratio calculation unit (FIG. 34)
.Target throttle opening degree/intake valve on/off timing calculation unit (FIG. 36)

Once the permission is granted for the start control operation by the "start control permission unit" (F_sidou=1), the "target fuel injection amount calculation unit" calculates the target fuel injection amount (TgTI). The "cylinder influent fuel amount calculation unit" predictively calculates the fuel amount (TICy1) injected and actually flowing into the cylinder. The "target air-fuel ratio calculation unit" calculates the target air-fuel ratio (TgFA). The "target air amount calculation unit" calculates the target air amount (TgTp) in such a manner as to realize the target air-fuel ratio {TgFA} based on the cylinder influent fuel amount (TICy1). The "target throttle opening degree/intake valve on/off timing calculation unit" calculates the target throttle opening degree (TgTVO) and the target intake valve on/off timing (TgIVC, TgIVO) in such a manner as to realize the target air amount (TgTp).

Each calculation unit is described in detail below.

<Start Control Permission Unit (FIG. 31)>

Figure 1:
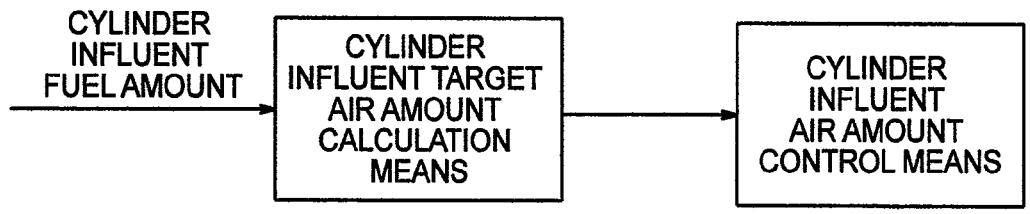
FIG. 1 shows an engine control apparatus described in claim 1.
Figure 2:
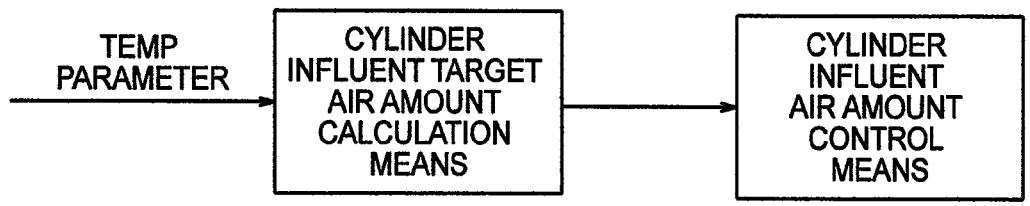
FIG. 2 shows an engine control apparatus described in claims 2 to 4.
Figure 3:
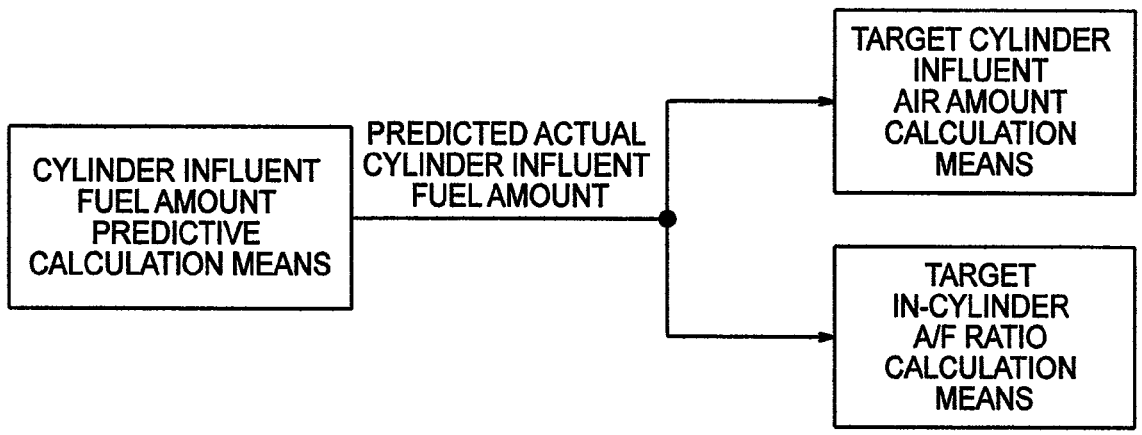
FIG. 3 shows an engine control apparatus described in claim 11.
Figure 4:
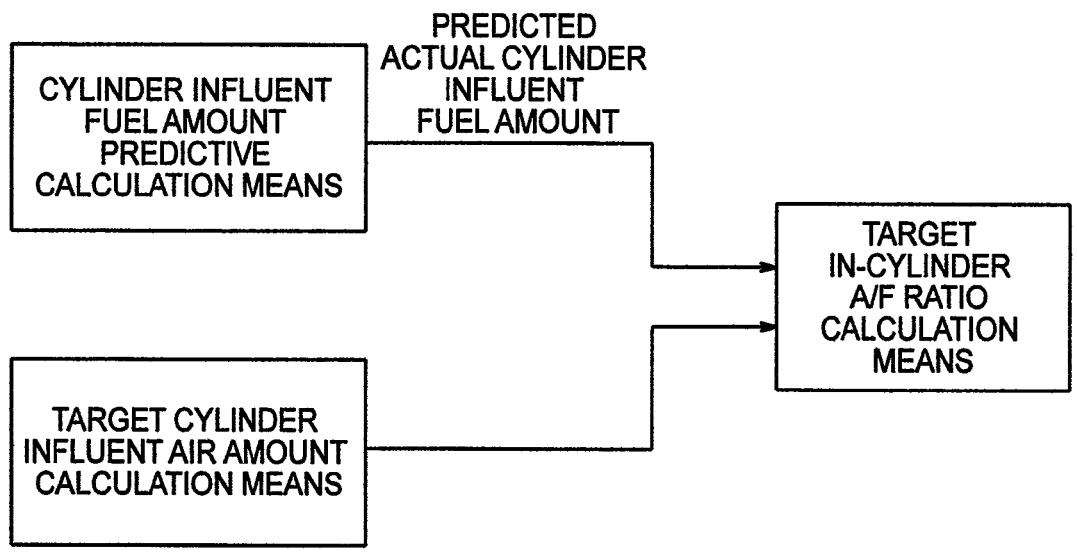
FIG. 4 shows an engine control apparatus described in claim 12.
Figure 5:
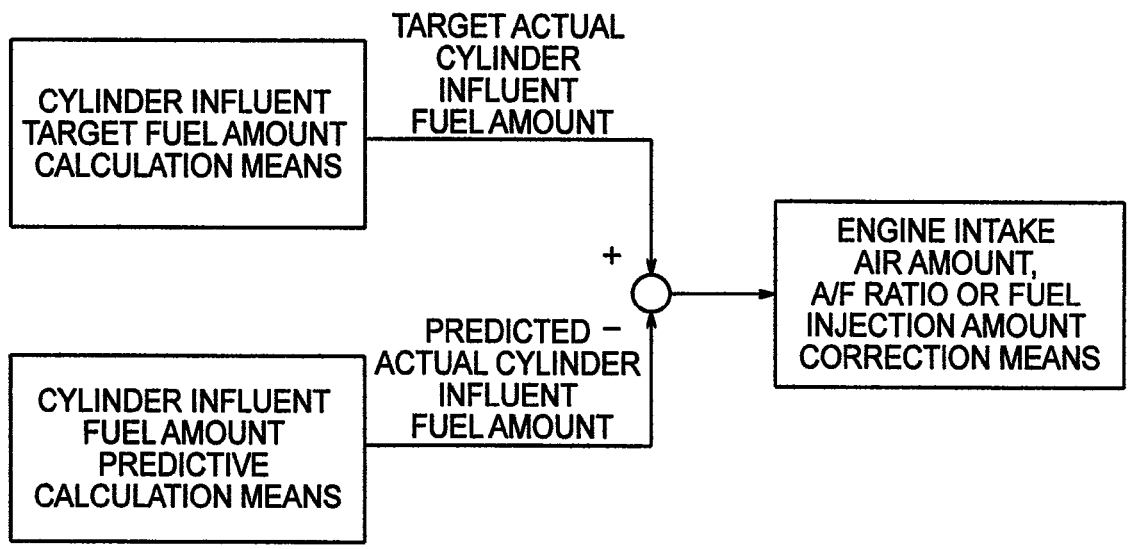
FIG. 5 shows an engine control apparatus described in claim 13.
Figure 6:
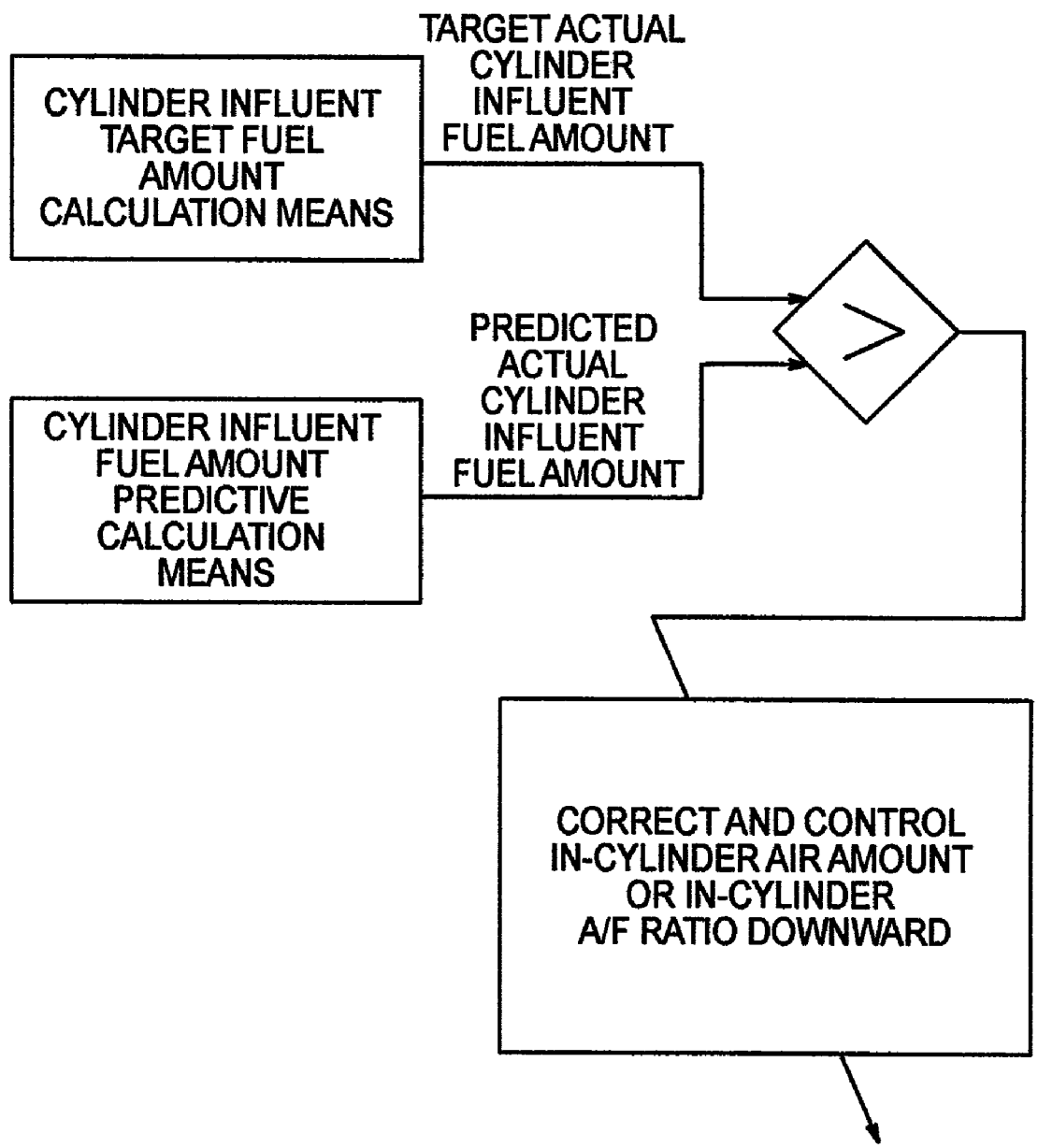
FIG. 6 shows an engine control apparatus described in claim 14.
Figure 7:
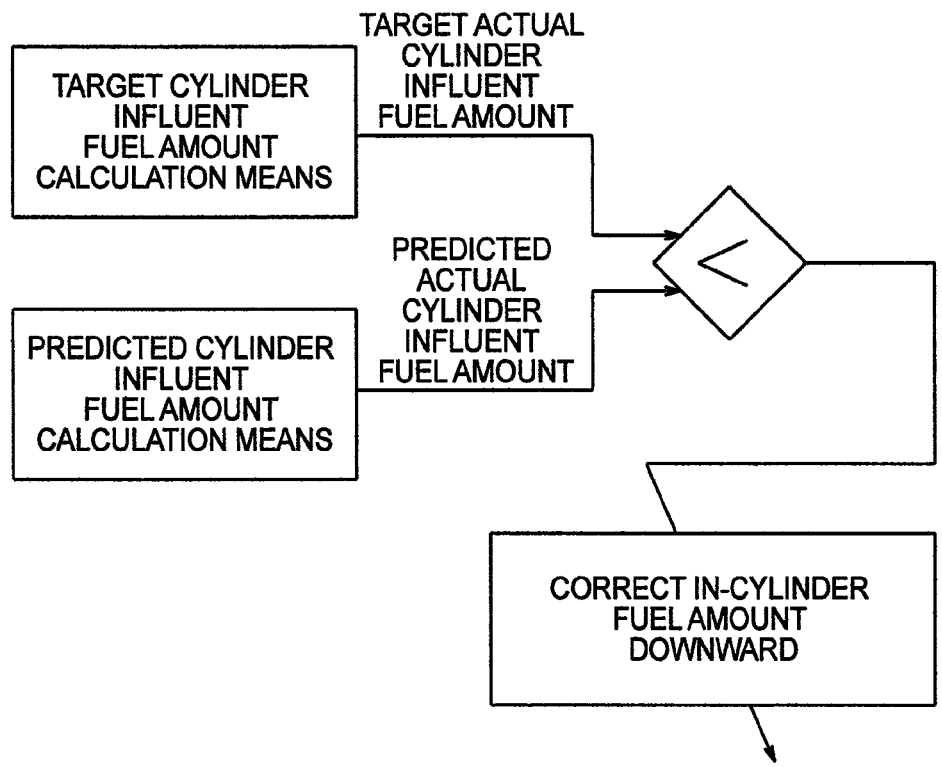
FIG. 7 shows an engine control apparatus described in claim 15.
Figure 8:
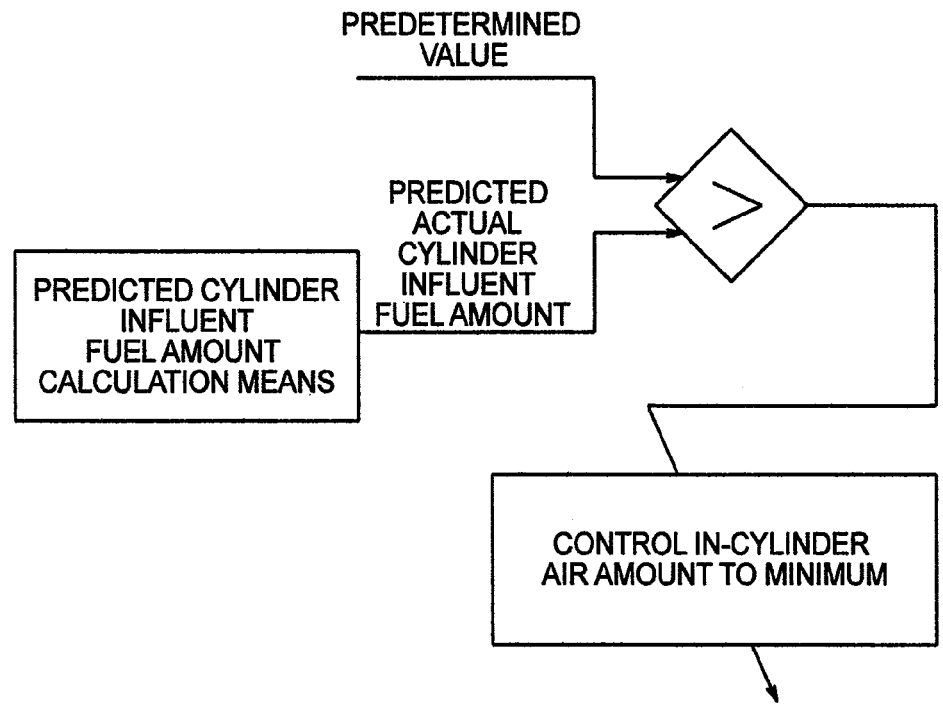
FIG. 8 shows an engine control apparatus described in claim 16.
Figure 9:
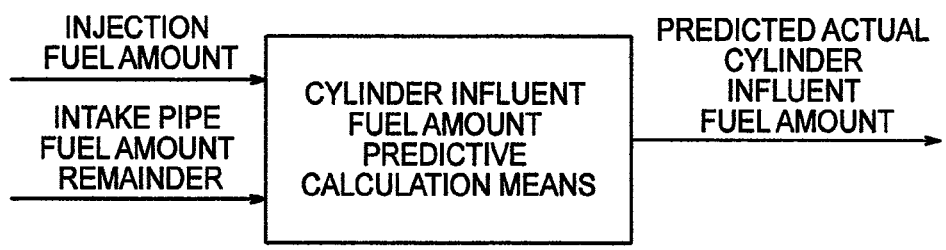
FIG. 9 shows an engine control apparatus described in claim 17.
Figure 10:
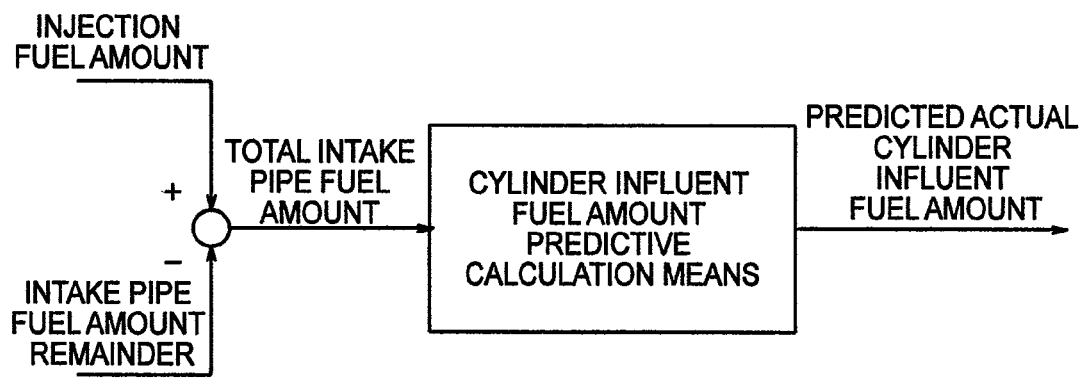
FIG. 10 shows an engine control apparatus described in claim 18.
Figure 11:
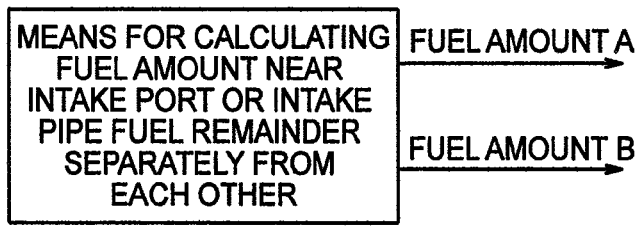
FIG. 11 shows an engine control apparatus described in claim 21.
Figure 12:
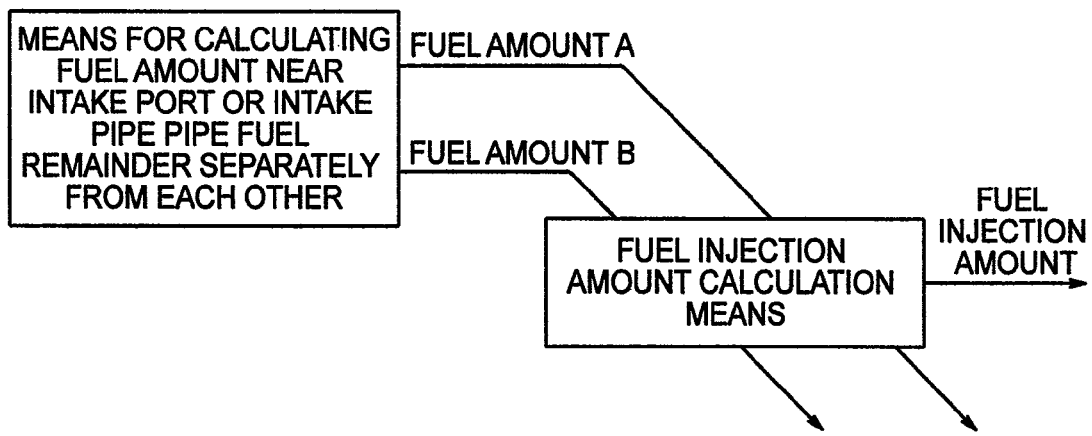
FIG. 12 shows an engine control apparatus described in claim 22.
Figure 13:
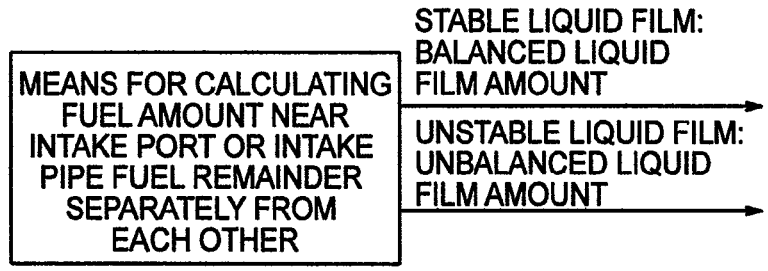
FIG. 13 shows an engine control apparatus described in claim 23.
Figure 14:
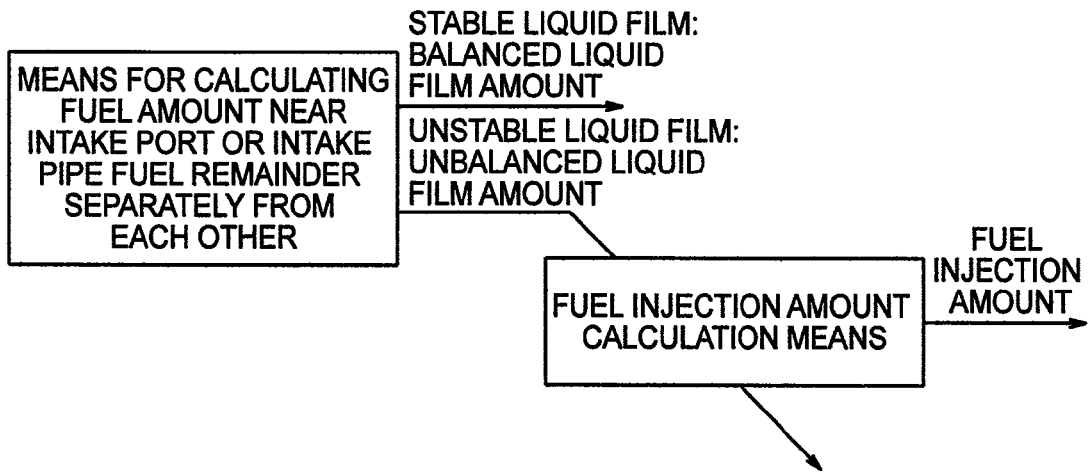
FIG. 14 shows an engine control apparatus described in claim 24.

This calculation unit (permission unit) determines (F_sidou) the permission of the start control operation. Specifically, as shown in FIG. 14, In the case where Ne (engine speed) changes from 0 to a value not lower than K1, F_sidou is set to 1. Assume that the state in which "F_sidou=1" and "TgNe (target engine idling speed after starting)−K1≦Ne≦TgNe+K2" is sustained for at least for K3 (number of combustion sessions), F_sidou is set to 0.

Incidentally, the parameters K1, K2, K3 for determining the convergence of the engine speed (determining the end of the starting period) may be empirically set. In the case where "F_sidou=1", however, the processes are executed by the target fuel injection amount calculation unit (FIG. 32), the cylinder influent fuel injection amount calculation unit (FIG. 33), the target air-fuel ratio calculation unit (FIG. 34), the target air amount calculation unit (FIG. 35) and the target throttle opening degree/intake valve on/off timing calculation unit (FIG. 36) described below.

<Target Fuel Injection Amount Calculation Unit (FIG. 32)>

Figure 32:
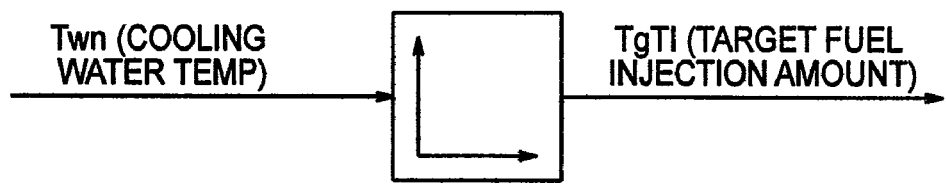
FIG. 32 is a block diagram showing the target fuel injection amount calculation unit according to the first to fourth embodiment.

This calculation unit calculates the target fuel injection amount (TgTI). Specifically, as shown in FIG. 32, the target fuel injection amount TgTI is determined with reference to a table based on the cooling water temperature (Twn).

<Cylinder Influent Fuel Injection Amount Calculation Unit (FIG. 33)>

Figure 33:
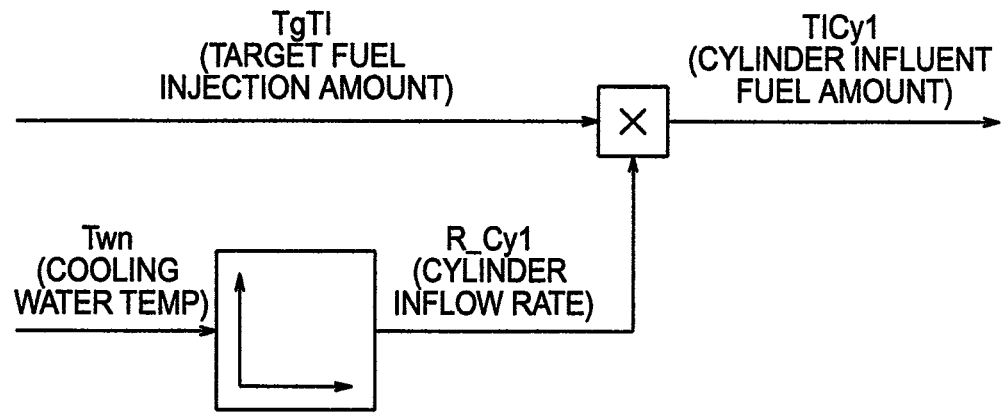
FIG. 33 is a block diagram showing the cylinder influent fuel amount calculation unit according to the first and the third to fourth embodiments.

This calculation unit calculates the cylinder influent fuel amount (TICy1). Specifically, as shown in FIG. 33, the target fuel injection amount (TgTi) is multiplied by the cylinder inflow rate (R_Cy1) to calculate the cylinder influent fuel amount (TICy1). The cylinder inflow rate (R_Cy1) is determined with reference to a table based on the cooling water temperature (Twn). The table for determining R_Cy1 is important and should be determined precisely from the test result using the actual device.

<Target Air-Fuel Ratio Calculation Unit (FIG. 34)>

Figure 34:
FIG. 34 is a block diagram showing the target air-fuel ratio calculation unit according to the first and the third to fourth embodiments.

This calculation unit calculates the target equivalent ratio (TgFA) as the inverse of the target air-fuel ratio. Specifically, as shown in FIG. 34, TgFA is set to TgFA_0. TgFA_0 should generally be set to 1.0.

<Target Air Amount Calculation Unit (FIG. 35)>

Figure 18:
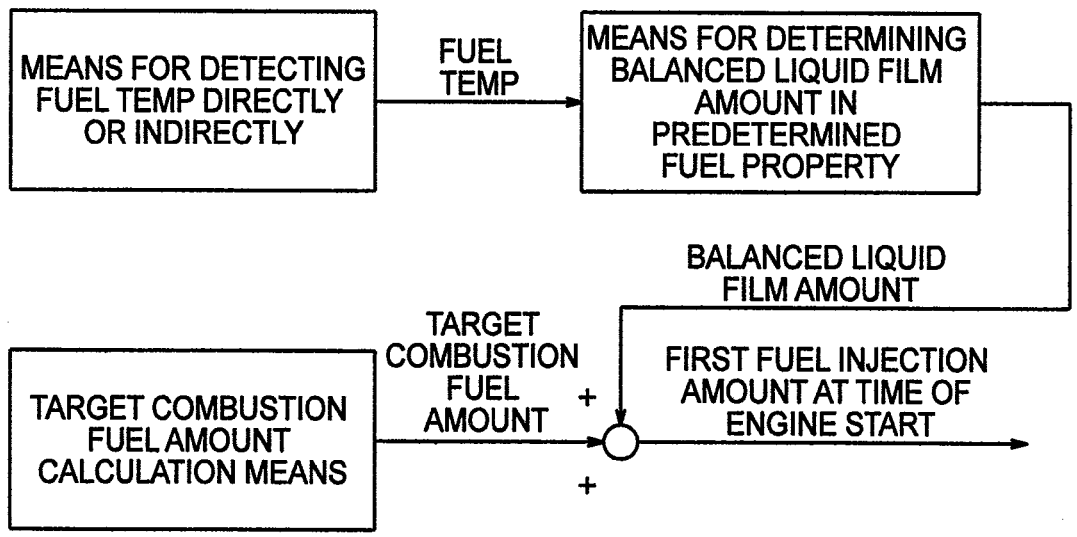
FIG. 18 shows an engine control apparatus described in claim 29.
Figure 19:
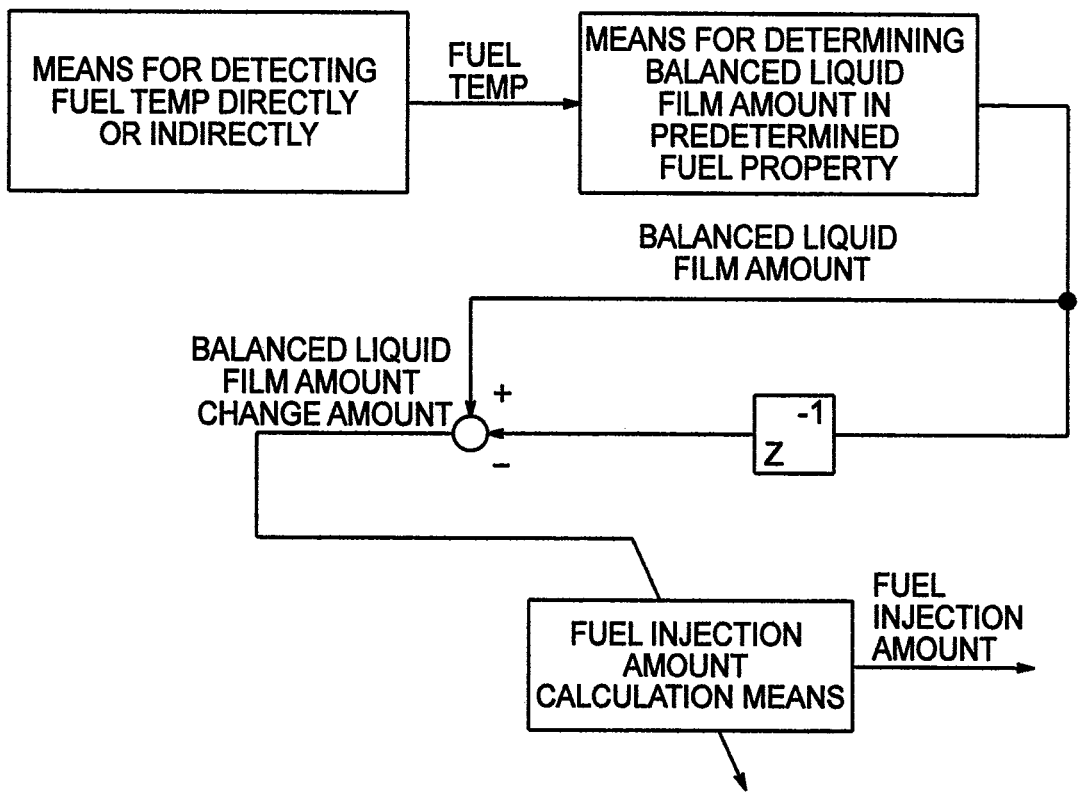
FIG. 19 shows an engine control apparatus described in claim 30.
Figure 20:
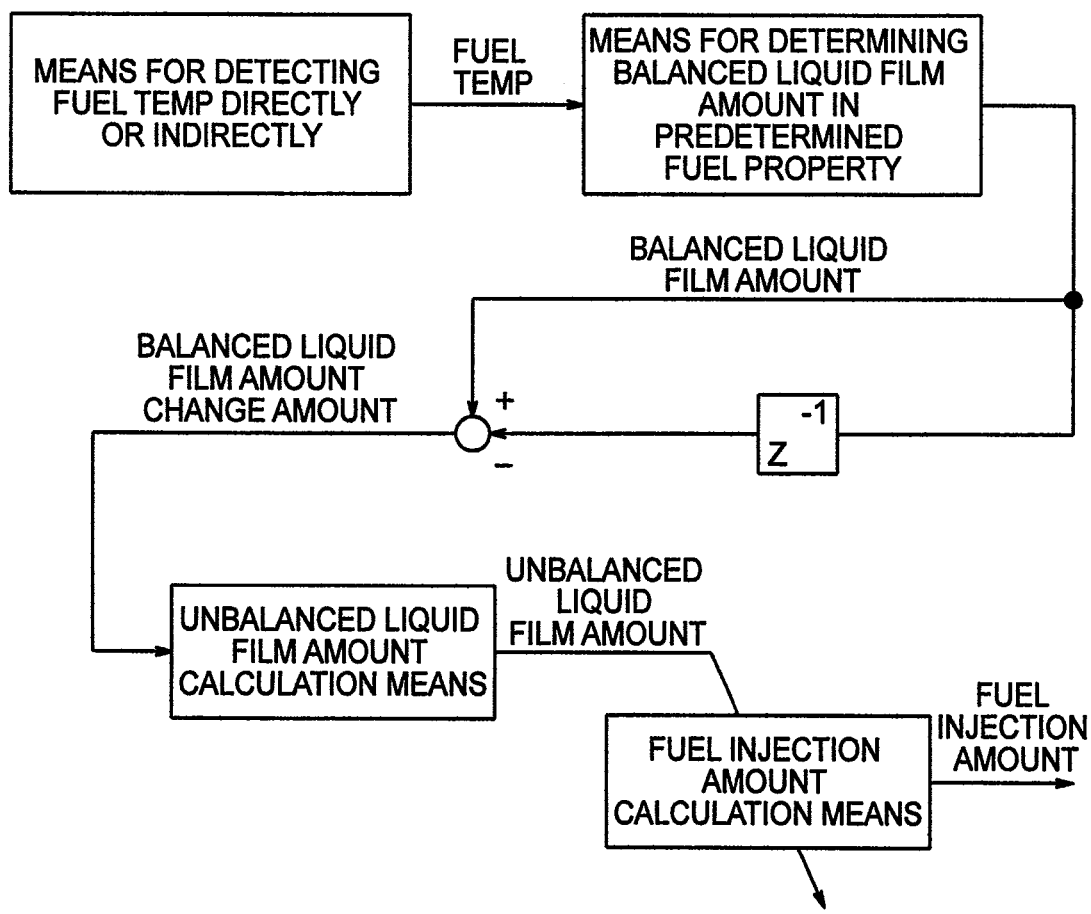
FIG. 20 shows an engine control apparatus described in claim 31.
Figure 21:
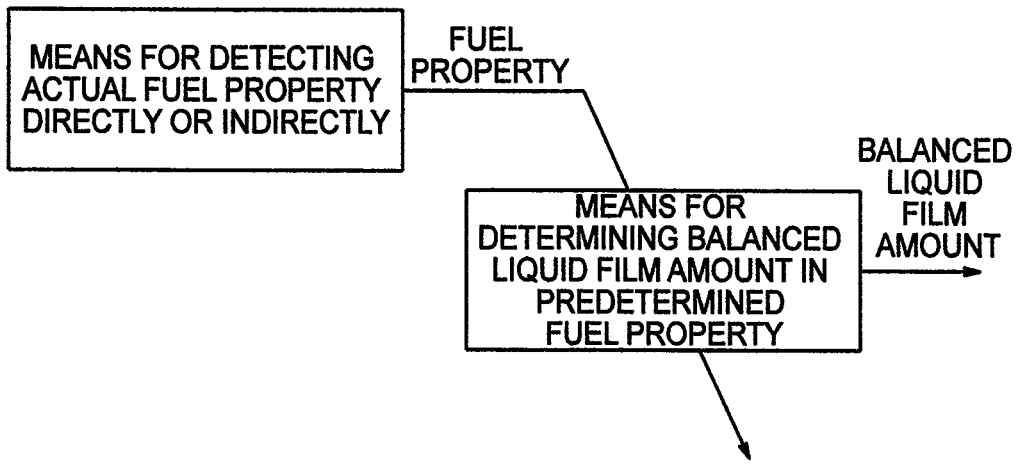
FIG. 21 shows an engine control apparatus described in claim 32.

This calculation unit calculates the target air amount (TgTp). Specifically, as shown in FIG. 18, the cylinder influent fuel amount (TICy1) is multiplied by the target air excess rate (1/TgFA) to calculate the target air amount (TgTp).

<Target Throttle Opening Degree/Intake Valve On/Off Timing Calculation Unit (FIG. 36)>

This calculation unit calculates TgTVO (target throttle opening degree), TgIVO (target intake valve on timing) and TgIVC (target intake valve off timing). Specifically, as shown in FIG. 36, TgTVO, TgIVO and TgIVC are determined with reference to each table based on TgTp(n) (target air amount) and Ne (engine speed). The values in each table should be determined theoretically or empirically (experimentally) to secure the operation amount capable of realizing the desired air amount.

According to this embodiment, the air amount is controlled in accordance with the fuel actually flowing into the cylinder. Even in the case where the amount of the fuel flowing into the cylinder is extremely reduced at a very low temperature, therefore, the air amount is reduced correspondingly. Therefore, the risk of a misfire which otherwise might be caused by an extreme lean air-fuel ratio and a deteriorated emission are avoided.

Second Embodiment

Unlike according to the first embodiment in which the target air amount is determined based on the cylinder influent fuel amount, the target air amount is determined directly from the temperature parameter (cooling water temperature) according to the second embodiment.

Figure 31:
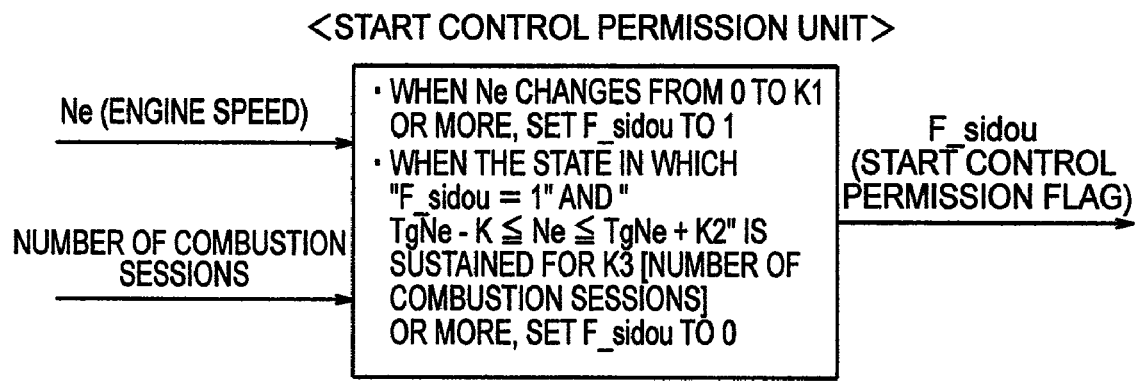
FIG. 31 is a block diagram showing the starting control permission unit according to the first to fourth embodiments.

FIG. 31 is a system diagram showing this embodiment, and being similar to that of the first embodiment, not described in detail.

FIG. 32 shows the internal configuration of the control unit 16, and being similar to that of the first embodiment, is not described in detail.

Figure 37:
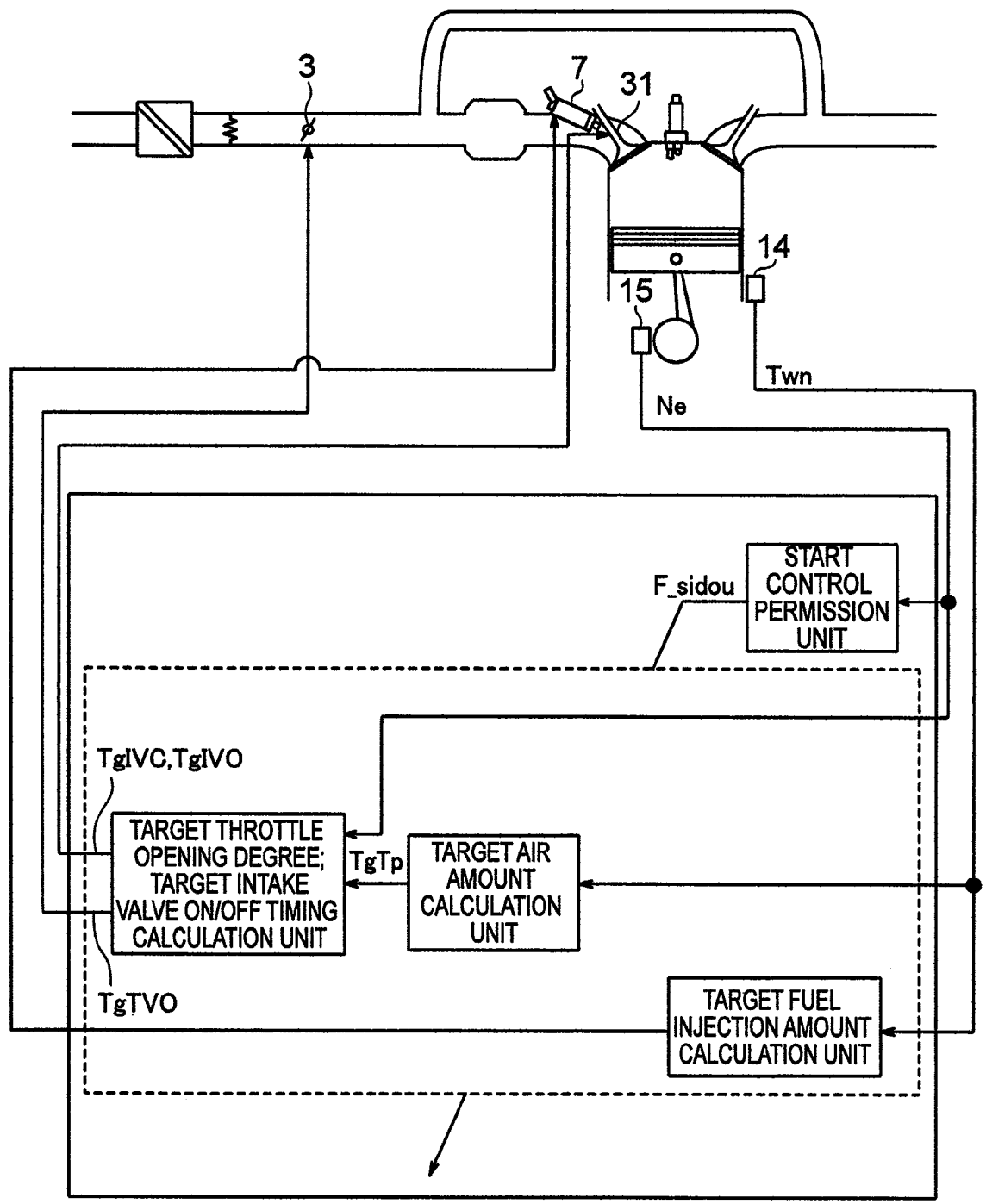
FIG. 37 is a block diagram showing the control system as a whole according to the second embodiment.

FIG. 37 is a block diagram showing the control system as a whole configured of the following calculation units:

.Start control permission unit (FIG. 31)
.Target fuel injection amount calculation unit (FIG. 32)
.Target air amount calculation unit (FIG. 38)
.Target throttle opening degree/intake valve on/off timing calculation unit (FIG. 36)

The "start control permission unit" permits the start control operation (F_sidou=1), and then, the "target fuel injection amount calculation unit" calculates the target fuel injection amount (TgT1). The "target air amount calculation unit" calculates the target air amount (TgTp) based on the cooling water temperature (Twn). The "target throttle opening degree/intake valve on/off timing calculation unit" calculates the target throttle opening degree (TgTVO) and the target intake valve on/off timing (TgIVC, TgIVO) in such a manner as to realize the target air amount (TgTp).

Each arithmetic operation (calculation) unit is explained in detail below.

<Start Control Permission Unit (FIG. 31)>

This component part is shown in FIG. 14, and being identical with that of the first embodiment, not explained in detail.

<Target Fuel Injection Amount Calculation Unit (FIG. 32)>

Figure 15:
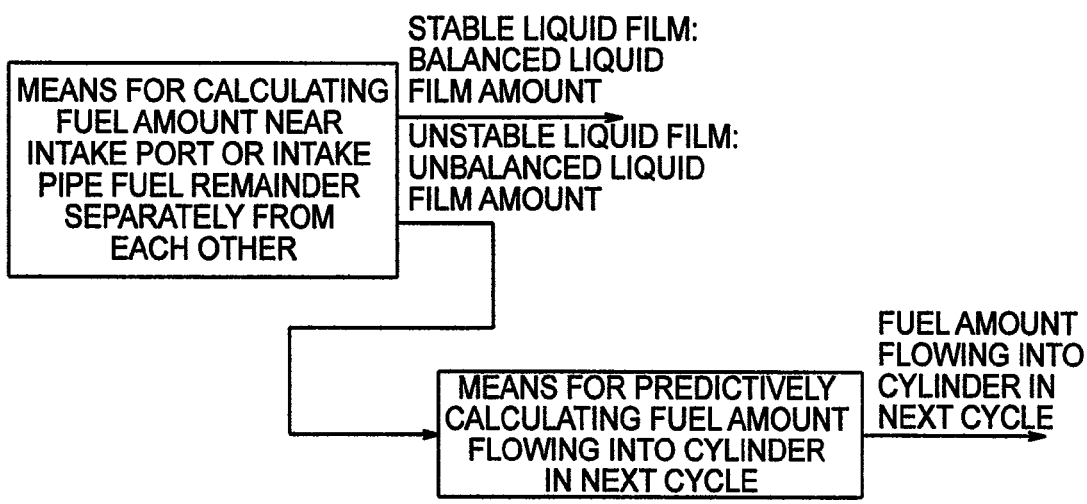
FIG. 15 shows an engine control apparatus described in claim 25.
Figure 16:
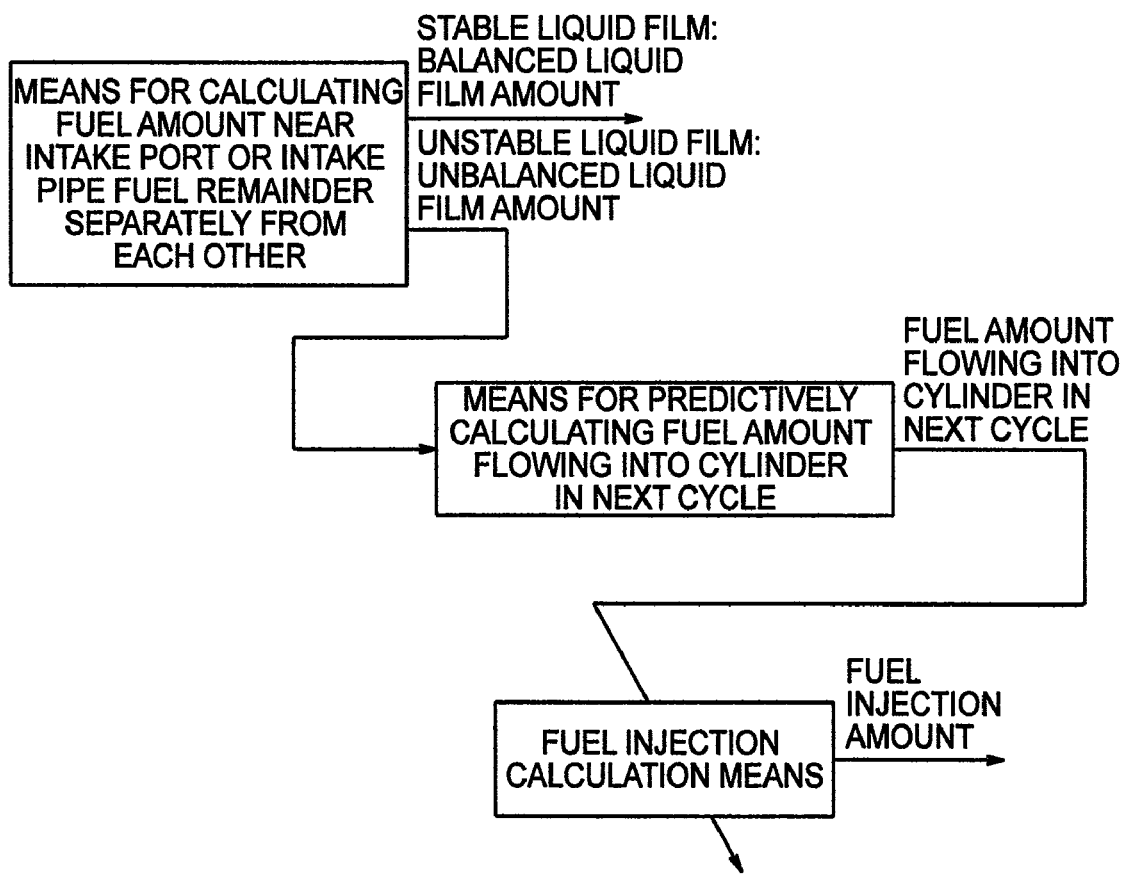
FIG. 16 shows an engine control apparatus described in claim 26.
Figure 17:
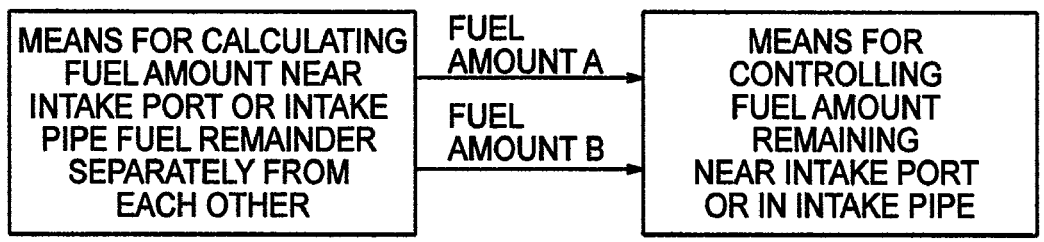
FIG. 17 shows an engine control apparatus described in claim 27.

This component part is shown in FIG. 15, and being identical with that of the first embodiment, not explained in detail.

<Target Air Amount Calculation Unit (FIG. 38)>

Figure 38:
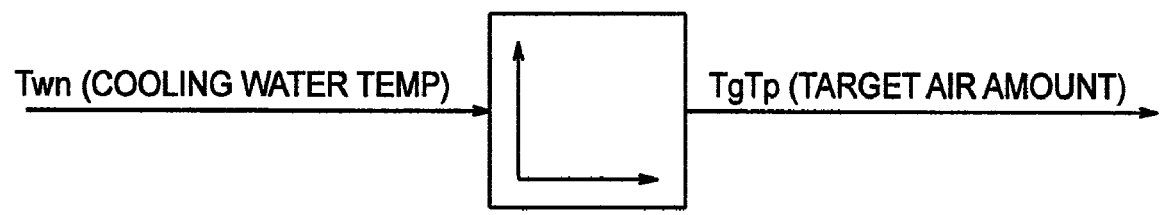
FIG. 38 is a block diagram showing the target air amount calculation unit according to the second embodiment.

This calculation unit calculates the target air amount (TgTp). Specifically, as shown in FIG. 38, the target air amount (TgTp) is calculated with reference to a table based on the cooling water temperature (Twn).

<Target Throttle Opening Degree/Intake Valve On/Off Timing Calculation Unit (FIG. 36)>

This component part is shown in FIG. 36, and being identical with that of the first embodiment, not explained in detail.

According to this embodiment, the air amount is controlled in accordance with the temperature parameter. Even in the case where the amount of the fuel flowing into the cylinder is extremely reduced at a very low temperature, therefore, the air amount is also reduced in accordance with the temperature. Thus, a misfire which otherwise might be caused by the air-fuel ratio extremely on lean side and the deterioration of the emission are avoided.

Third Embodiment

Although the target air amount is determined based on the amount of the fuel flowing into the cylinder according to the first embodiment, the target air amount is corrected in accordance with the difference between the target fuel injection amount and the amount of the fuel flowing into the cylinder according to the third embodiment.

FIG. 31 is a system diagram showing this embodiment, and being similar to that of the first embodiment, not described in detail.

FIG. 32 shows the internal configuration of the control unit 16, and being similar to that of the first embodiment, not described in detail.

Figure 39:
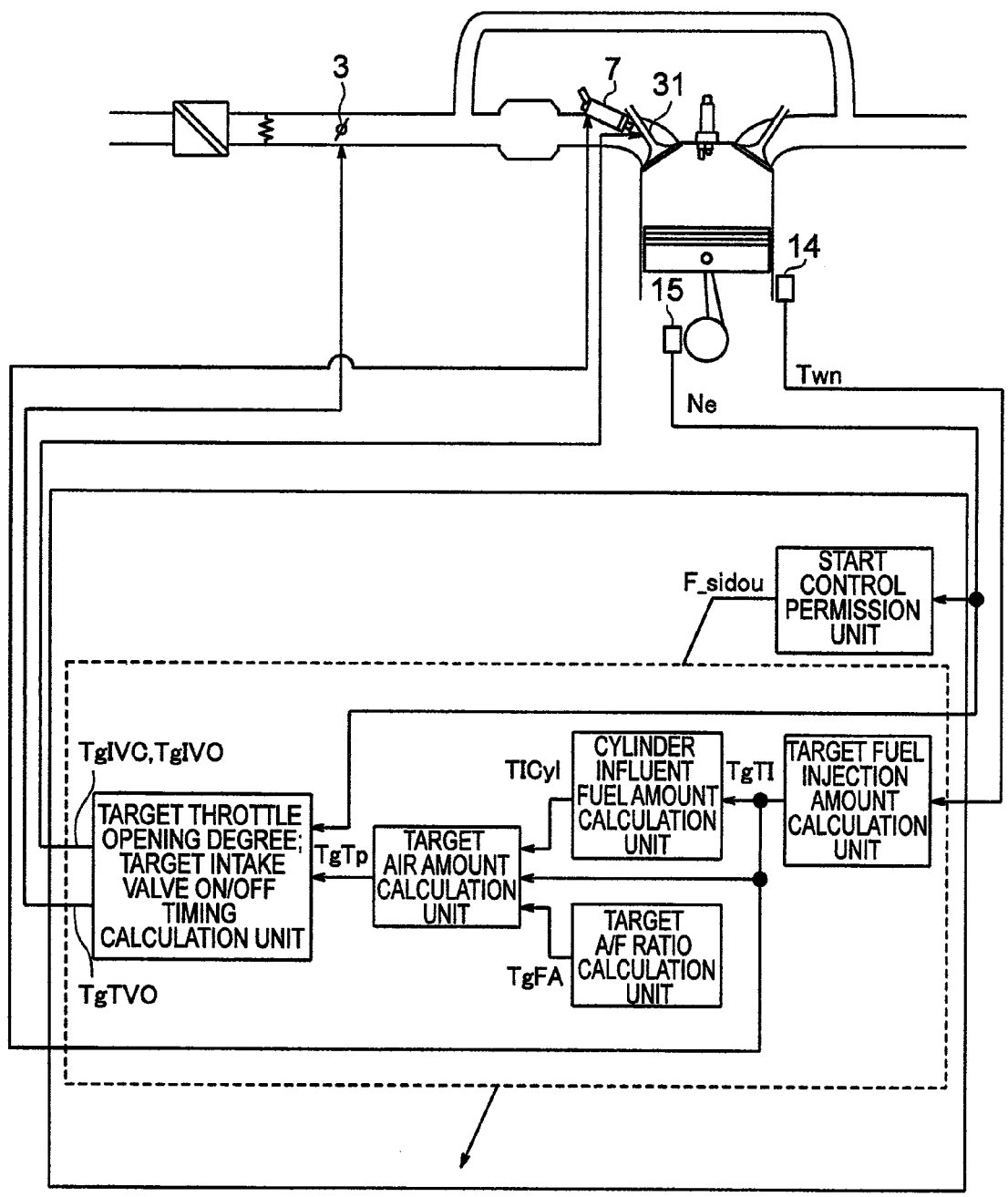
FIG. 39 is a block diagram showing the control system as a whole according to the third and fourth embodiments.

FIG. 39 is a block diagram showing the control system as a whole. As compared with the first embodiment (FIG. 30), the target fuel amount (TgTI) is input to the target air amount calculation unit. The remaining parts of the configuration are identical with those of the first embodiment.

Each calculation unit is explained in detail below.

<Start Control Permission Unit (FIG. 31)>

This component part, shown in FIG. 14, is identical with that of the first embodiment and therefore, not described in detail.

<Target Fuel Injection Amount Calculation Unit (FIG. 32)>

This component part, shown in FIG. 15, is identical with that of the first embodiment and therefore, not described in detail.

<Cylinder Influent Fuel Amount Calculation Unit (FIG. 33)>

This component part, shown in FIG. 33, is identical with that of the first embodiment and therefore, not described in detail.

Figure 40:
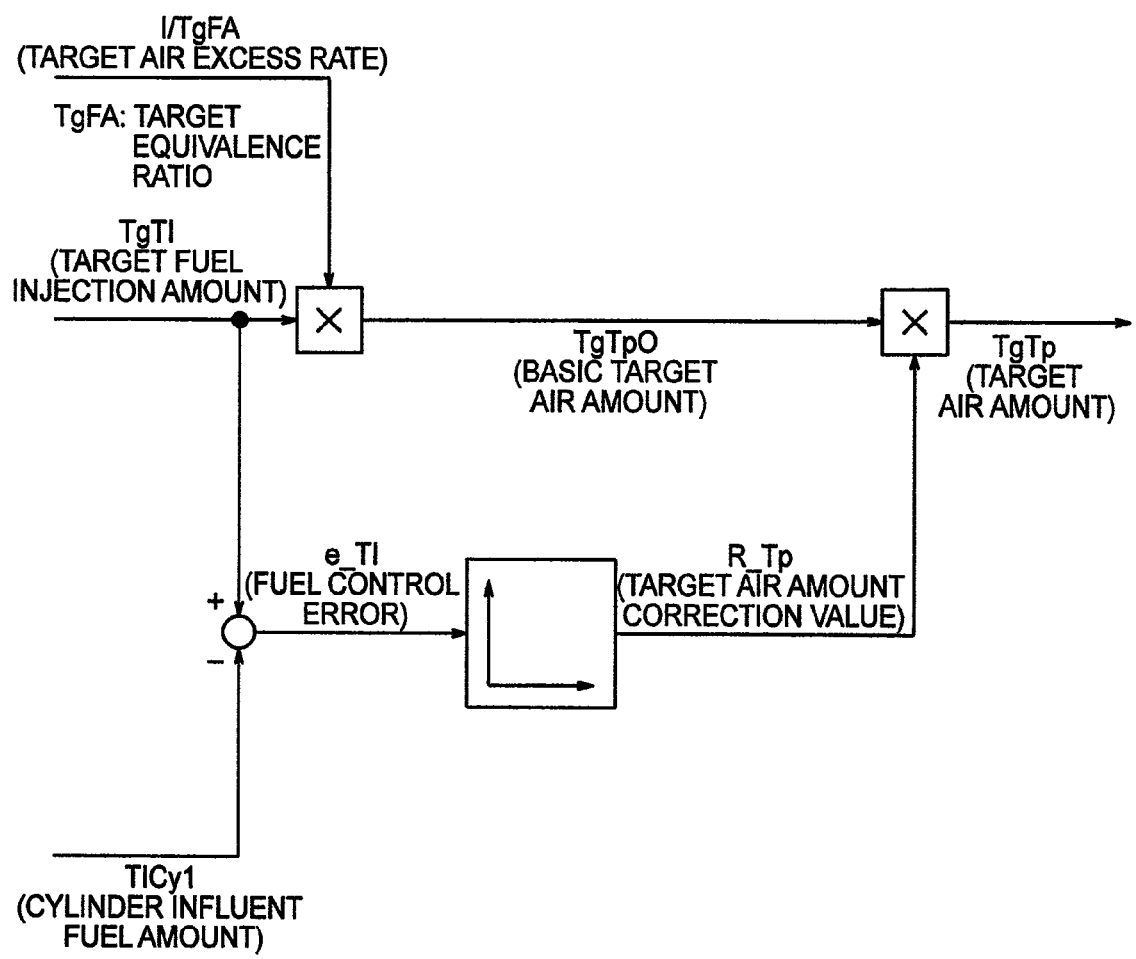
FIG. 40 is a block diagram showing the target air amount calculation unit according to the third embodiment.

<Target Air Amount Calculation Unit (FIG. 40)>

This calculation unit calculates the target air amount (TgTp). Specifically, a shown in FIG. 40, the cylinder influent fuel amount (TICy1) is multiplied by the target air excess rate (1/TgFA) to calculate the basic target air amount (TgTpO). The basic target air amount (TgTpO) is multiplied by the corrected target air amount (R_Tp) to determine the target air amount (TgTp). The target air amount (R_Tp) is determined with reference to a table from the fuel control error (e_T1) providing the difference between the target fuel injection amount (TgTI) and the cylinder influent fuel amount (TICy1).

<Target Throttle Opening Degree/Intake Valve On/Off Timing Calculation Unit (FIG. 36)>

This component part, shown in FIG. 36, is identical with that of the first embodiment and therefore, not described in detail.

According to this embodiment, the target air amount is calculated based on the fuel injection amount. Actually, however, the air amount is corrected and controlled in accordance with the amount of the fuel flowing into the cylinder. Even in the case where the amount of the fuel flowing into the cylinder is extremely reduced at a very low temperature, therefore, the air amount is also reduced in accordance with the temperature. Thus, a misfire which otherwise might be caused by the air-fuel ratio extremely on lean side and the deterioration of emission are avoided.

Fourth Embodiment

In the first embodiment, the target air amount is determined based on the amount of the fuel flowing into the cylinder. According to the fourth embodiment, however, in the case where the amount of the fuel flowing into the cylinder (the cylinder influent fuel amount) is not larger than a predetermined value, the combustion is judged to have reached its limit and the target air amount is minimized (to zero).

FIG. 14 is a system diagram showing this embodiment, and being similar to that of the first embodiment, not described in detail.

FIG. 15 shows the internal configuration of the control unit 16, and being similar to that of the first embodiment, not described in detail.

Figure 22:
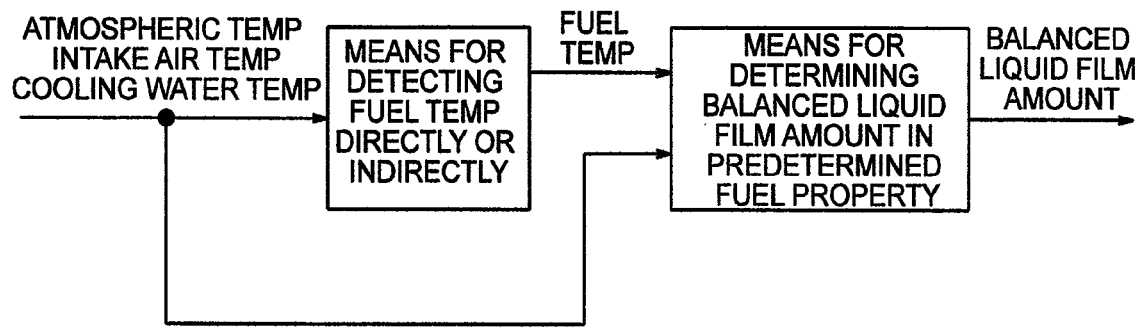
FIG. 22 shows an engine control apparatus described in claim 33.
Figure 23:
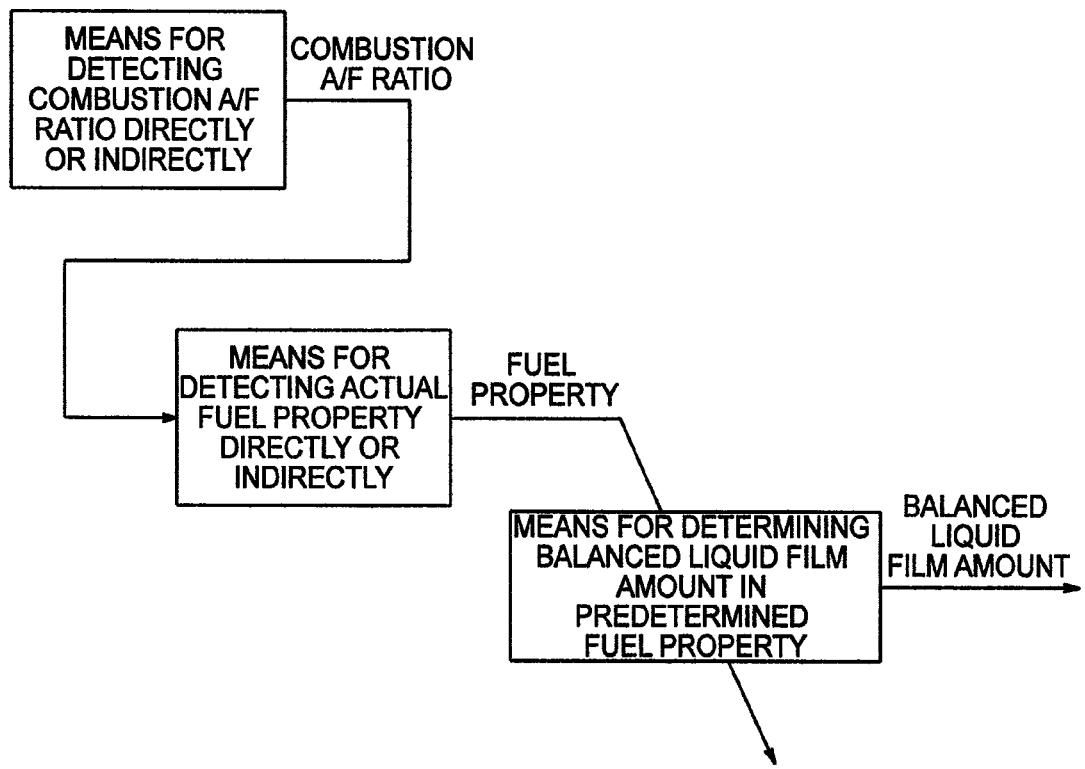
FIG. 23 shows an engine control apparatus described in claim 34.

FIG. 22 is a block diagram showing the control system as a whole, and being similar to that of the third embodiment, not described in detail.

Each calculation unit is described in detail below.

<Start Control Permission Unit (FIG. 31)>

This component part, shown in FIG. 31, is identical with that of the first embodiment and therefore, not described in detail.

<Target Fuel Injection Amount Calculation Unit (FIG. 32)>

This component part, shown in FIG. 32, is identical with that of the first embodiment and therefore, not described in detail.

<Cylinder Influent Fuel Amount Calculation Unit (FIG. 33)>

This component part, shown in FIG. 33, is identical with that of the first embodiment and therefore, not described in detail.

<Target Air-Fuel Ratio Calculation Unit (FIG. 34)>

This component part, shown in FIG. 34, is identical with that of the first embodiment and therefore, not described in detail.

<Target Air Amount Calculation Unit (FIG. 41)>

Figure 41:
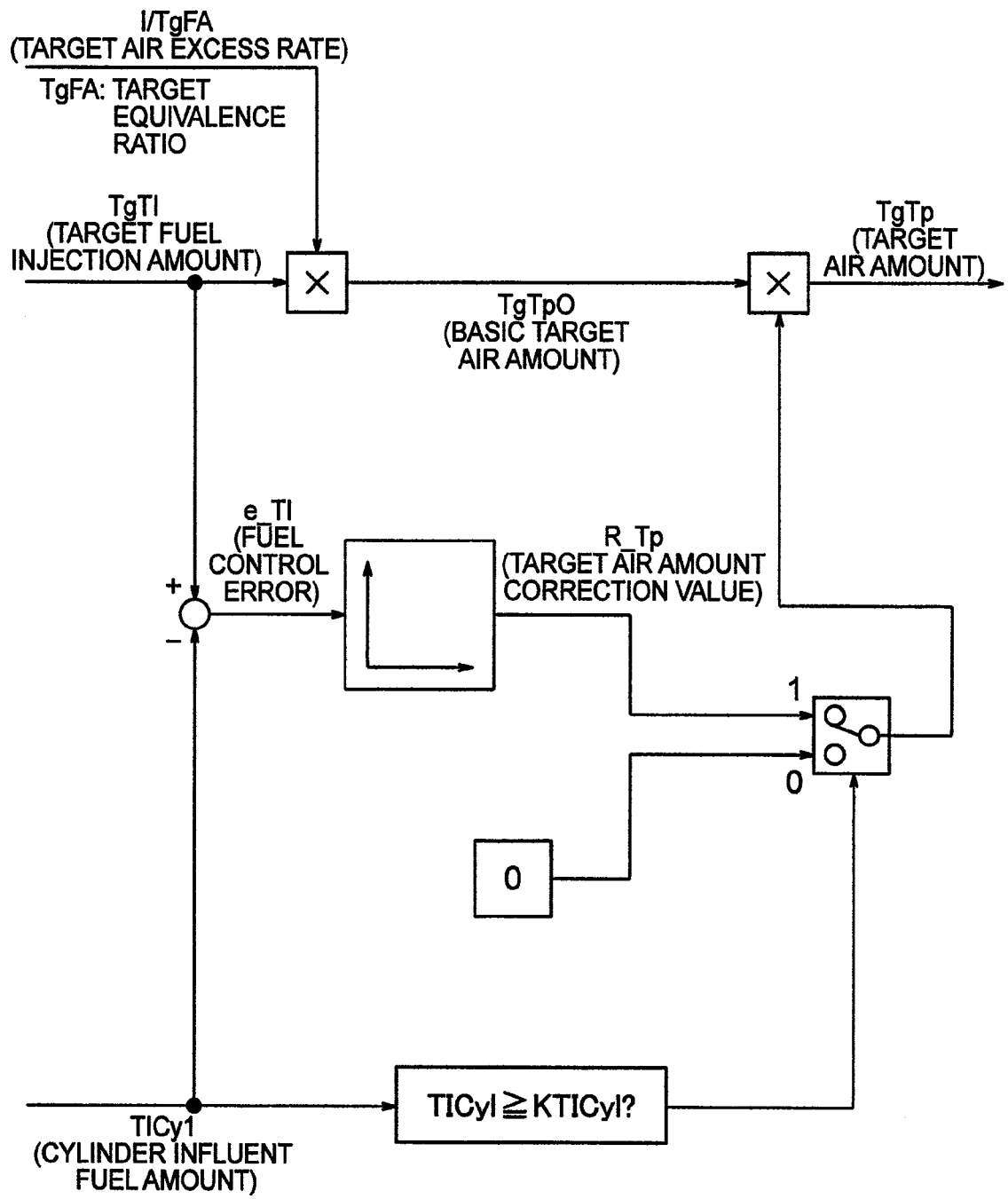
FIG. 41 is a block diagram showing the target air amount calculation unit according to the fourth embodiment.

This calculation unit calculates the target air amount (TgTp). Specifically, as shown in FIG. 41, the cylinder influent fuel amount (TICy1) is multiplied by the target air excess rate (1/TgFA) to calculate the basic target air amount (TgTpO). In the case where the cylinder influent fuel amount (TICy1) is not smaller than a predetermined value (KTICy1), the basic target air amount (TgTpO) is multiplied by the corrected target air amount (R_Tp) to determine the target air amount (TgTp). The corrected target air amount (R_Tp) is determined with reference to a table from the fuel control error (e_TI) providing the difference between the target fuel injection amount (TgTI) and the cylinder influent fuel amount (TICy1). In the case where the cylinder influent fuel amount (TICy1) is smaller than the predetermined value (KTICy1), on the other hand, the basic air amount (TgTpO) is multiplied by zero so that the target air amount (TgTp) is set to zero.

<Target Throttle Opening Degree/Intake Valve On/Off Timing Calculation Unit (FIG. 36)>

This component part, shown in FIG. 36, is identical with that of the first embodiment and therefore, not described in detail.

Fifth Embodiment

Figure 42:
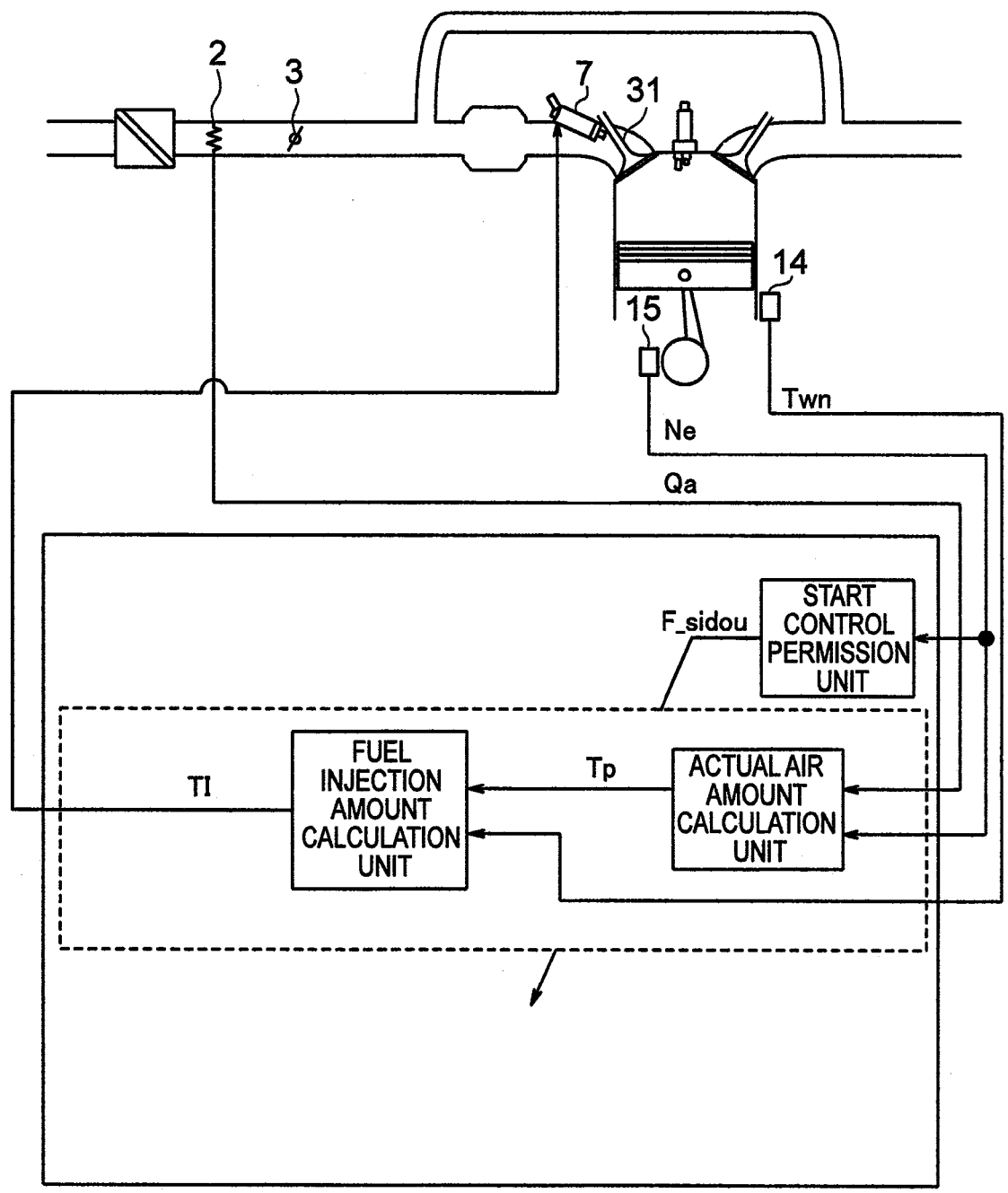
FIG. 42 is a block diagram showing the control system as a whole according to a fifth embodiment.

FIG. 42 is a block diagram showing the whole control system according to the fifth embodiment, which is configured of the following calculation units:

.Start control permission unit (FIG. 14)

Figure 43:
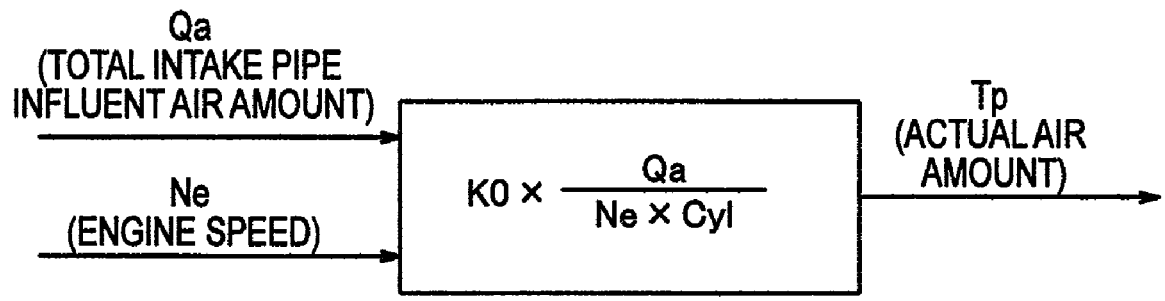
FIG. 43 is a block diagram showing the actual air amount calculation unit according to the fifth to sixth embodiments.
Figure 44:
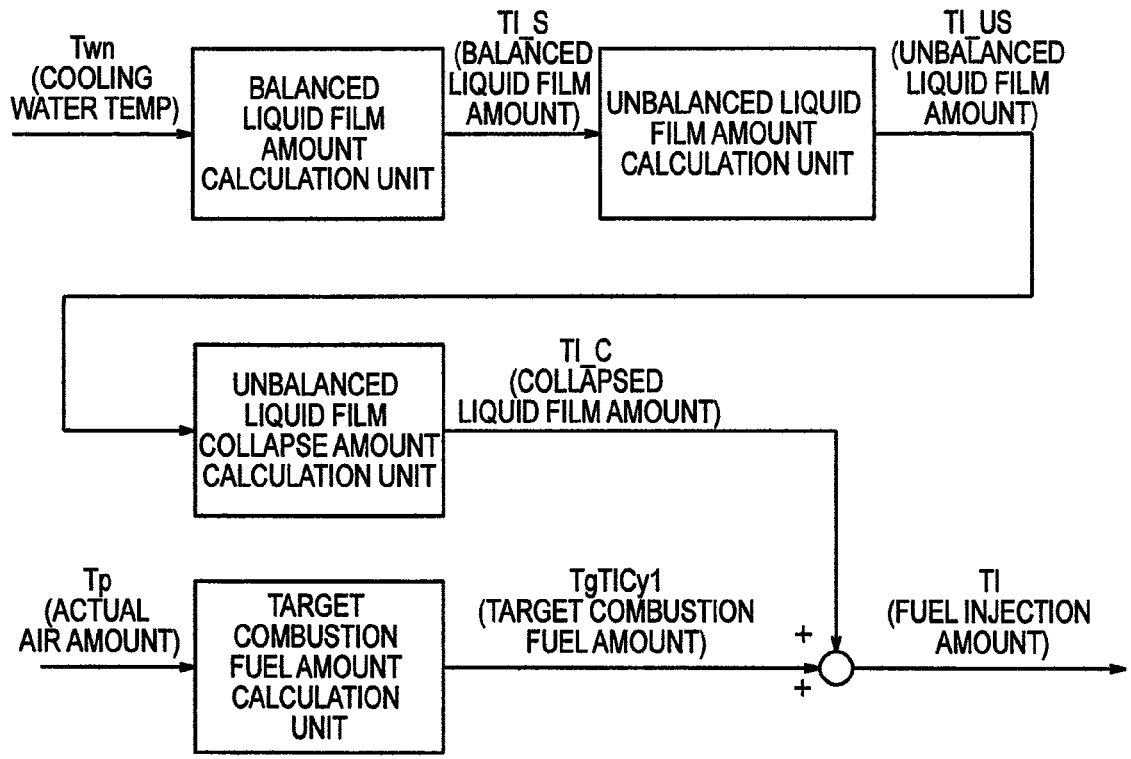
FIG. 44 is a block diagram showing the fuel injection amount calculation unit according to the fifth embodiment.

.Actual air amount calculation unit (FIG. 43)
.Fuel injection amount calculation unit (FIG. 44)

The "start control permission unit" determines the start control permission flag (F_sidou) to permit the start control operation. The "actual air amount calculation unit" calculates the actual air amount (Tp) per cylinder based on the output signal of the air flow sensor 2, etc. The "fuel injection amount calculation unit" calculates the fuel injection amount (TI) based on the actual air amount (Tp) and the cooling water temperature (Twn).

Each calculation unit is described in detail below.

<Start Control Permission Unit (FIG. 14)>

This component part is identical with that of the first embodiment and not described in detail.

<Actual Air Amount Calculation Unit (FIG. 43)>

This calculation unit calculates Tp (actual air amount). Specifically, the equation shown in FIG. 43 is calculated, where Cy1 designates the number of cylinders, and KO is determined according to the specification of the injector (the relation between the fuel injection pulse width and the fuel injection amount).

<Fuel Injection Amount Calculation Unit (FIG. 44)>

Figure 47:
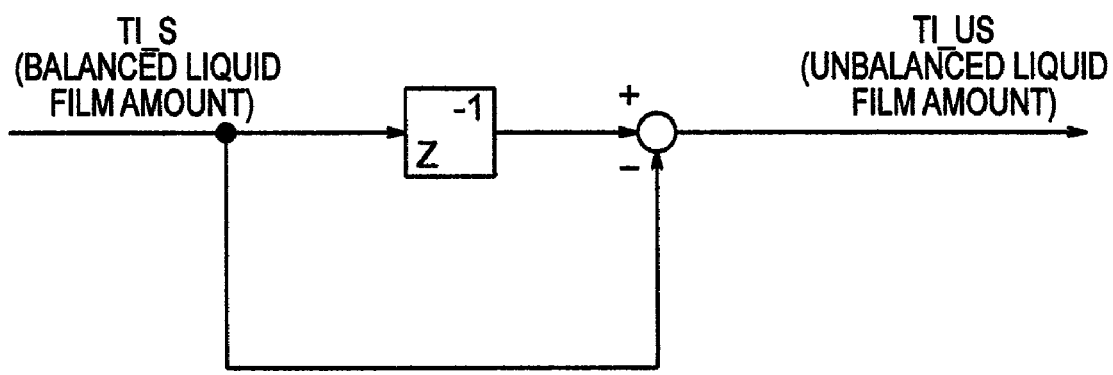
FIG. 47 is a block diagram showing the unbalanced liquid film amount calculation unit according to the fifth to sixth embodiments.
Figure 48:
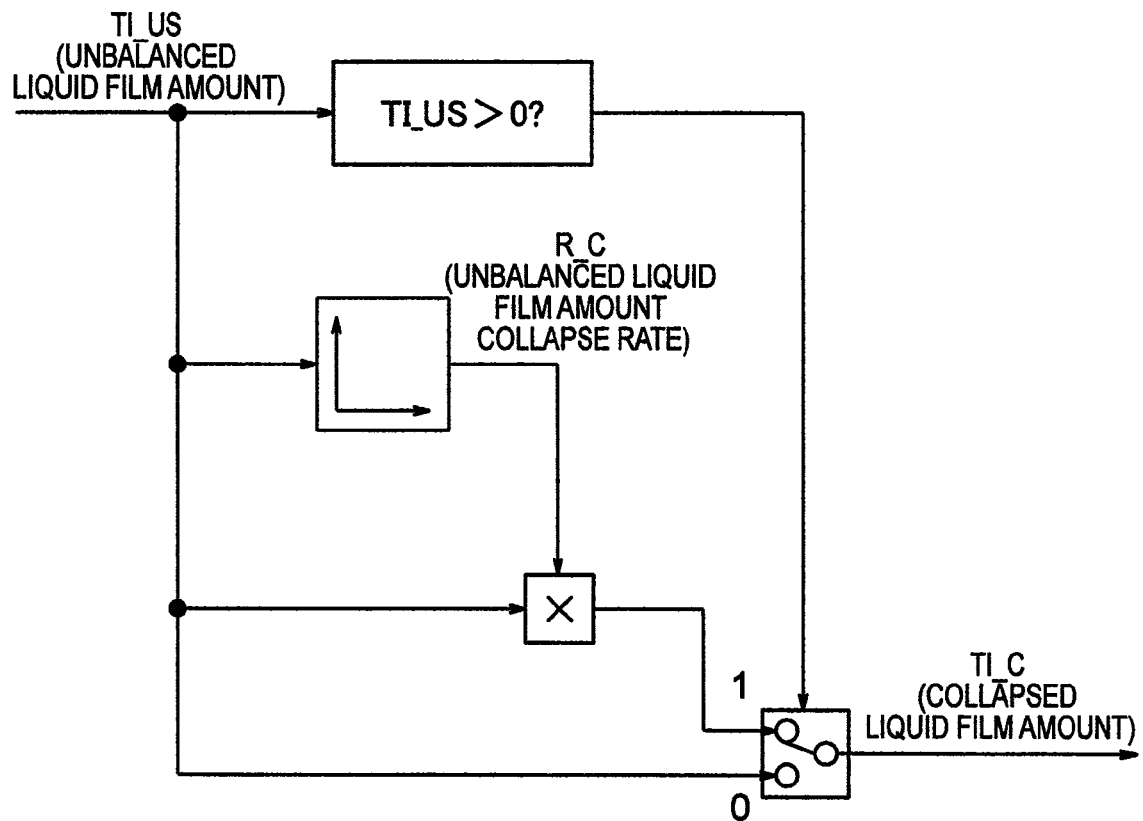
FIG. 48 is a block diagram showing the unbalanced liquid film fuel collapse amount calculation unit according to the fifth to sixth embodiments.

This calculation unit calculates the fuel injection amount (TI). Specifically, as shown in FIG. 44, the following four calculation units are included:

.Target combustion fuel amount calculation unit (FIG. 45)
.Balanced liquid film amount calculation unit (FIG. 46)
.Unbalanced liquid film amount calculation unit (FIG. 47)
.Unbalanced liquid film collapse amount calculation unit (FIG. 48)

The target combustion fuel amount calculation unit calculates the target fuel amount (TgTICy1) combusted in the cylinder from the actual in-cylinder air amount (Tp). The balanced liquid film amount calculation unit determines the balanced liquid film amount (TI_S) from the cooling water temperature (Twn). The unbalanced liquid film amount calculation unit determines the unbalanced liquid film amount (TI_US) from the balanced liquid film amount (TI_S). The unbalanced liquid film collapse amount calculation unit determines the collapsed liquid film amount (TI_C) from the unbalanced liquid film amount (TI_US).

The value of the target combustion fuel amount (TgTICy1) less the collapsed liquid film amount (TI_C) is determined as the final fuel injection amount (TI). Each calculation unit is described in detail below.

Figure 45:
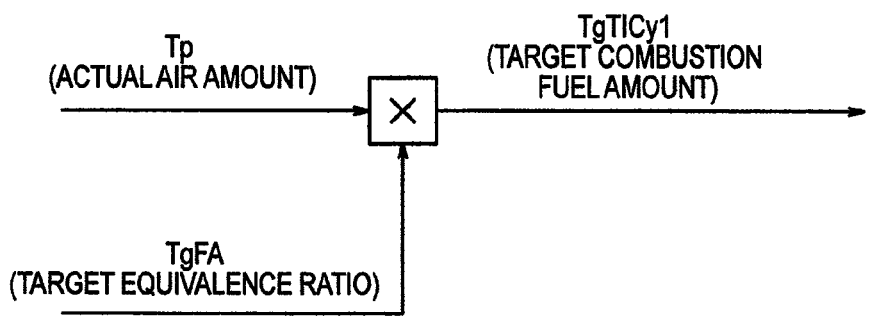
FIG. 45 is a block diagram showing the target combustion fuel amount calculation unit according to the fifth to sixth embodiments.

.Target combustion fuel amount calculation unit (FIG. 45)

Figure 24:
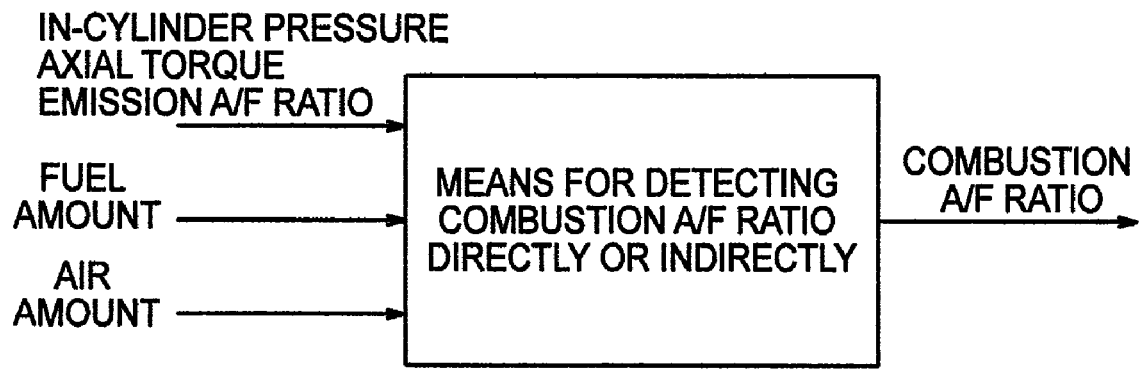
FIG. 24 shows an engine control apparatus described in claim 35.
Figure 25:
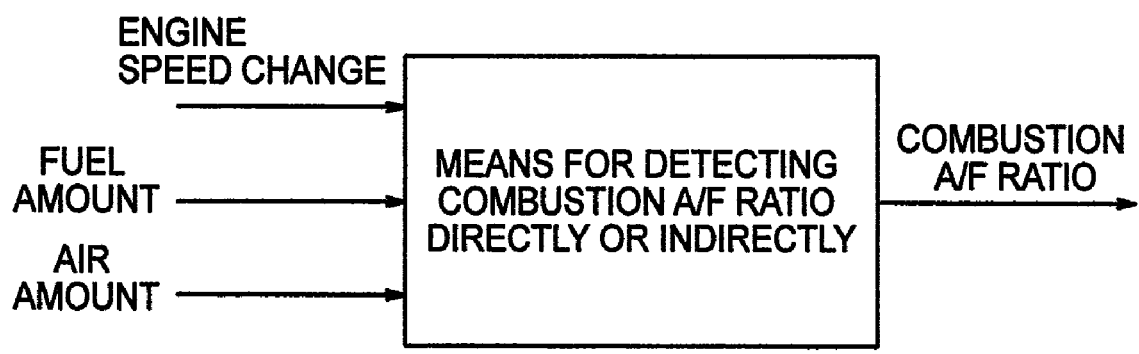
FIG. 25 shows an engine control apparatus described in claim 36.

This calculation unit determines the target combustion fuel amount (TgTICy1). Specifically, as shown in FIG. 24, the actual air amount (Tp) is multiplied by the target equivalence ratio (TgFA) to determine the target combustion fuel amount (TgTICy1). The target equivalence ratio (TgFA) designates the combustion equivalence ratio (air-fuel ratio) in the cylinder and should be generally set to 1.0.

Figure 46:
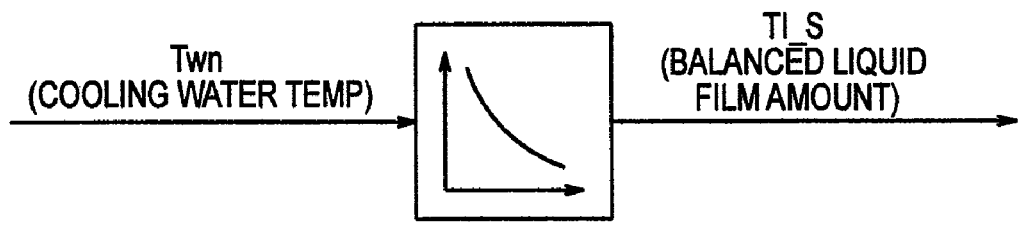
FIG. 46 is a block diagram showing the balanced liquid film amount calculation unit according to the fifth embodiment.

.Balanced liquid film amount calculation unit (FIG. 46)

Figure 26:
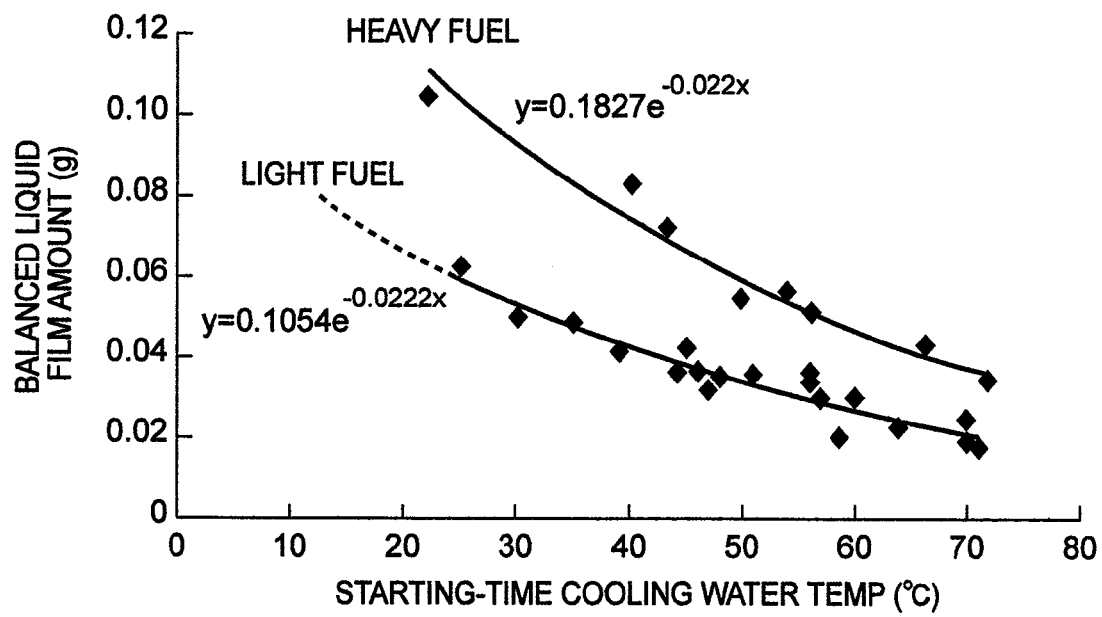
FIG. 26 shows the characteristic of the balanced liquid film amount.

This calculation unit determines the balanced liquid film amount (TI_S). Specifically, as shown in FIG. 46, the balanced liquid film amount (TI_S) is determined with reference to a table from the cooling water temperature (Twn). This table is set as shown in FIG. 26. Incidentally, in the case where the actual fuel property cannot be detected in advance, some fuel property is assumed for this purpose. In the case where the emission performance is given priority, the table is set with the balanced liquid film amount for the comparatively light fuel property used in the emission verification test. In the case where the starting performance (robustness) is given priority, on the other hand, the table is set with the balanced liquid film amount for the comparatively heavy fuel property.

.Unbalanced liquid film amount calculation unit (FIG. 47)

This calculation unit calculates the unbalanced liquid film amount (TI_US). Specifically, as shown in FIG. 47, the unbalanced liquid film amount (TI_US) is determined from the difference between the balanced liquid film amount (TI_Sz) in the previous cycle and the balanced liquid film amount (TI_S) in the present cycle. In other words, the unbalanced liquid film amount (TI_US) constitutes the change amount of the balanced liquid film amount during one cycle of the same cylinder.

.Unbalanced liquid film collapsed amount calculation unit (FIG. 48)

Figure 27:
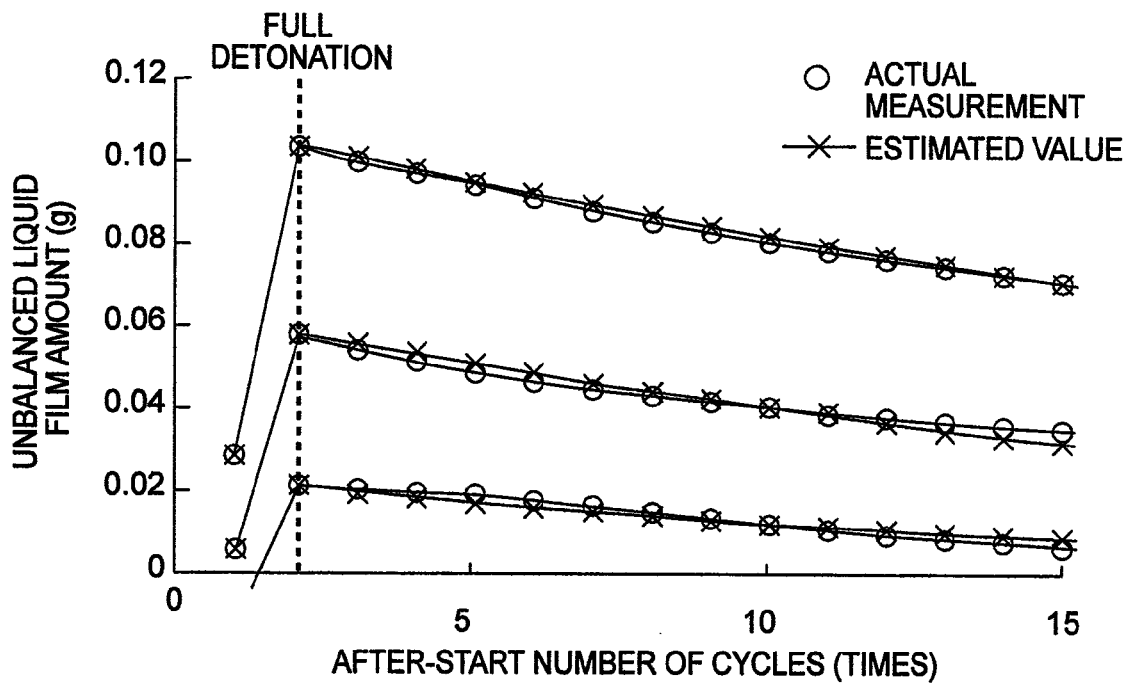
FIG. 27 shows the characteristic of the unbalanced liquid film amount.

This calculation unit calculates the collapsed liquid film amount (TI_C). Specifically, as shown in FIG. 48, assume that the unbalanced liquid film amount (TI_US) is larger than zero, i.e. that an excessive fuel amount exists in the intake pipe. Then, the unbalanced liquid film amount (TI_US) is multiplied by the unbalanced liquid film collapse rate (R_C) to determine the collapsed liquid film amount (TI_C). The unbalanced liquid film collapse rate (R_C) is determined from the unbalanced liquid film amount (TI_US) with reference to a table. This table is set as shown in FIG. 27.

In the case where the unbalanced liquid film amount (TI_US) is not larger than zero, i.e. in the case where the fuel amount in the intake pipe runs short, on the other hand, the unbalanced liquid film amount (TI_US) is determined as the collapsed liquid film amount (TI_C).

According to this invention, the injection fuel amount is corrected by the amount equivalent to a gradually collapsed part of the unstable unbalanced liquid film and flowing into the cylinder. Thus, the fuel amount flowing into the cylinder is controlled with high accuracy in such a manner as to realize the target air-fuel ratio. As a result, both the emission performance and the starting performance are optimized from the engine starting time.

Sixth Embodiment

According to the fifth embodiment, the actual fuel property is not specifically detected, and the balanced liquid film amount is set with a predetermined fuel property. According to the sixth embodiment, the fuel property is estimated from the engine speed change after starting, and the balanced liquid film amount is switched based on the result of estimation.

The system control unit is similar to that of the first embodiment and therefore, not described in detail.

Figure 49:
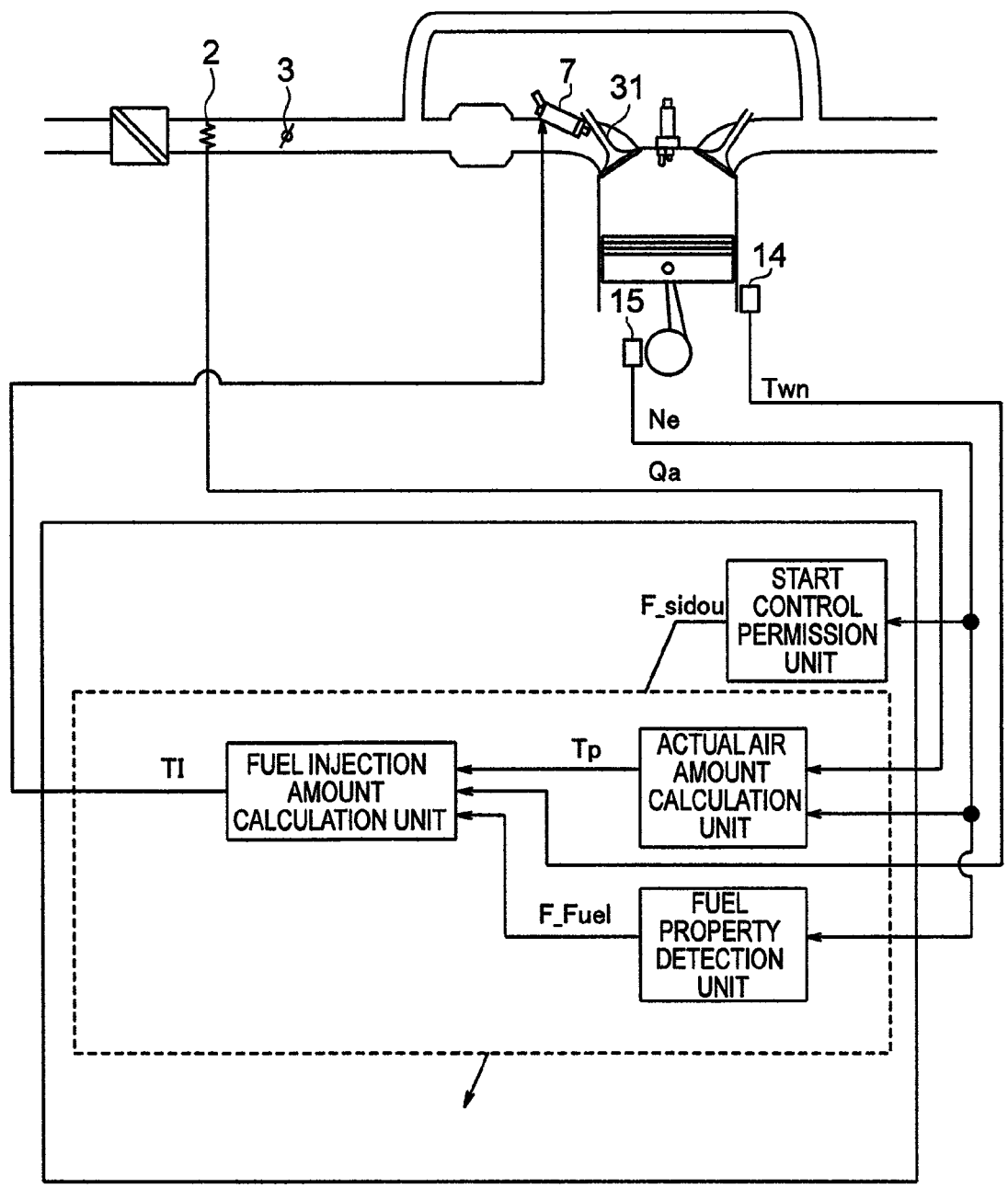
FIG. 49 is a block diagram showing the control system as a whole according to the fifth embodiment.

FIG. 49 is a block diagram showing the control system as a whole. As compared with the fifth embodiment (FIG. 42), the fuel property detection unit is added. The fuel property detection nit determines the fuel property in binary fashion (F_Fuel), and based on the result thereof, changes the fuel injection amount (balanced liquid film amount). The remaining parts of the configuration are identical with those of the fifth embodiment.

Each calculation unit is explained in detail below.

<Start Control Permission Unit>

This component part is identical with the corresponding one of the first embodiment and therefore not explained in detail.

<Actual Air Amount Calculation Unit (FIG. 43)>

FIG. 43 shows the actual air amount calculation unit which is identical with the corresponding one in the fifth embodiment and therefore not described in detail.

<Fuel Property Detection Unit (FIG. 50)>

Figure 50:
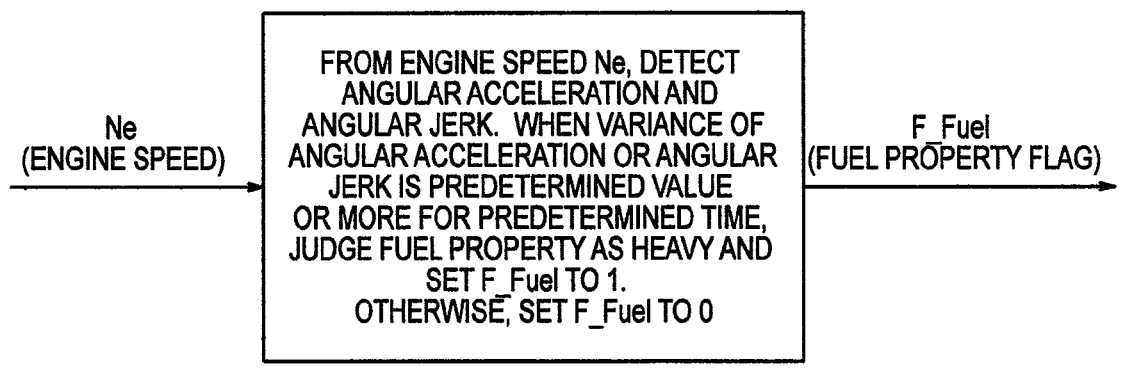
FIG. 50 is a block diagram showing the fuel property detection unit according to the fifth embodiment.

This detection unit detects (estimates) the actual fuel property. Specifically, as shown in FIG. 50, the angular acceleration and the angular jerk are detected from the engine speed Ne. In the case where the variance of the angular acceleration or the angular jerk for a predetermined time is not less than a predetermined value, the fuel property is determined as heavy and F_Fuel is set to 1.

Otherwise, F_Fuel is set to zero. As described in SUMMARY OF THE INVENTION, the actual combustion air-fuel ratio is determined from the engine speed change and the fuel property is estimated. Incidentally, as long as the heavy fuel is used, the combustion air-fuel ratio is on lean side, and therefore, the engine speed change is increased.

<Fuel Injection Amount Calculation Unit (FIG. 51)>

Figure 51:
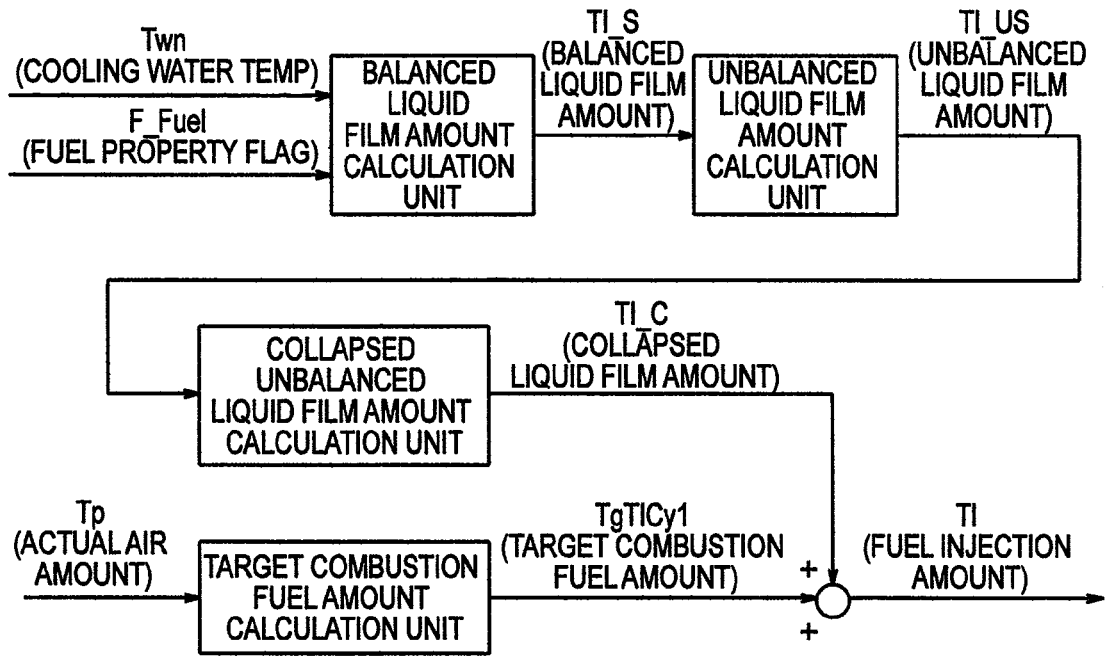
FIG. 51 is a block diagram showing the fuel injection amount calculation unit according to the fifth embodiment.

This calculation unit calculates the fuel injection amount (TI). Specifically, as shown in FIG. 51, the following four calculation units are included.
.Target combustion fuel amount calculation unit (FIG. 45)
.Balanced liquid film amount calculation unit (FIG. 46)
.Unbalanced liquid film amount calculation unit (FIG. 47)
.Unbalanced liquid film collapse amount calculation unit (FIG. 48)

The target combustion fuel amount calculation unit calculates the target fuel amount (TgTICy1) combusted in the cylinder from the actual in-cylinder air amount (Tp). The balanced liquid film amount calculation unit determines the balanced liquid film amount (TI_S) from the cooling water temperature (Twn) and the fuel property flag F_Fuel. The unbalanced liquid film amount calculation unit determines the unbalanced liquid film amount (TI_US) from the balanced liquid film amount (TI_S). The unbalanced liquid film collapse amount calculation unit determines the collapsed liquid film amount (TI_C) from the unbalanced liquid film amount (TI_US).

The value of the target combustion fuel amount (TgTICy1) less the collapsed liquid film amount (TI_C) is determined as the final fuel injection amount (TI). Each calculation unit is described in detail below.
.Target combustion fuel amount calculation unit (FIG. 45)

Figure 52:
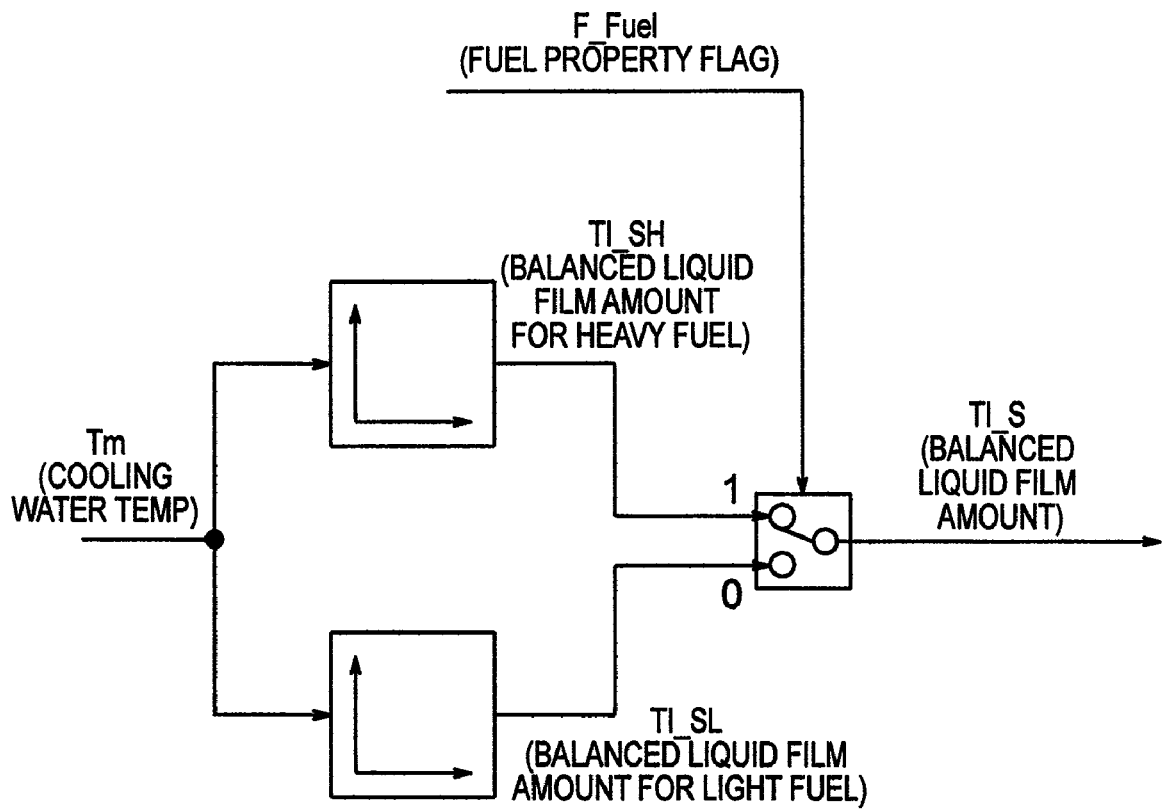
FIG. 52 is a block diagram showing the balanced liquid film amount calculation unit according to the fifth embodiment.

This component part, shown in FIG. 24, is identical with that of the first embodiment and therefore, not described in detail.
.Balanced liquid film amount calculation unit (FIG. 52)

This calculation unit determines the balanced liquid film amount (TI_S). Specifically, as shown in FIG. 52, the balanced liquid film amount (TI_SH) for the heavy fuel or the balanced liquid film amount (TI_SL) for the light fuel is determined from the cooling water temperature (Twn) with reference to tables. Both tables are set as shown in FIG. 26. Which balanced liquid film amount is used depends on the value of the fuel property flag (F_Fuel). Incidentally, in the case where the actual fuel property is not detected before starting the engine, some fuel property is assumed and set. In the case where the emission performance is given priority, the balanced liquid film amount for the comparatively light fuel property used for the emission verification test may be the choice. In the case where the starting performance (robustness) is given priority, on the other hand, the balanced liquid film amount for the comparatively heavy fuel property may be employed. As an alternative, the balanced liquid film amount for the heavy property is used in the very early stage of the starting period, while after starting the engine, the balanced liquid film amount is forcibly switched to that for the light fuel property regardless of the actual fuel property. In the case where the actual fuel property is light, the air-fuel ratio is optimized, and therefore, the emission is reduced. In the case where the actual fuel property is heavy, on the other hand, the air-fuel ratio turns lean. Nevertheless, the heavy property is detected by the fuel property detection unit due to the engine speed change and F_Fuel is set to 1. As a result, the balanced liquid film amount for heavy property is automatically restored, thereby optimizing the running performance and the emission performance.

.Unbalanced liquid film amount calculation unit (FIG. 47)

This component part, shown in FIG. 47, is identical with that of the fifth embodiment and therefore, not described in detail.

.Unbalanced liquid film collapse amount calculation unit (FIG. 48)

This component part, shown in FIG. 48, is identical with that of the sixth embodiment and therefore, not described in detail.

According to this embodiment, the target air amount is calculated based on the fuel injection amount. The air amount is corrected in accordance with the fuel actually flowing into the cylinder. Even in the case where the fuel amount flowing into the cylinder is extremely reduced at a very low temperature, the corresponding reduction of the air amount makes it possible to avoid both a misfire and a deteriorated emission which otherwise might occur due to the air-fuel ratio on extremely lean side.

According to this invention, the balanced liquid film amount is automatically switched in accordance with the actual fuel property, and therefore, the unbalanced liquid film amount also changes correspondingly. Thus, a part of the unbalanced liquid film amount which is collapsed and gradually flows into the cylinder is also optimized in fuel property and the injection fuel amount corrected correspondingly. As a result, the cylinder influent fuel amount is controlled constantly with high accuracy in such a manner as to realize the target air-fuel ratio. In this way, both the emission performance and the starting performance are optimized from the engine starting time.

Incidentally, in order that the fuel is pulverized and introduced into the cylinder using the sufficient shearing stress of the intake air flow, the injection timing is preferably set to end before the intake valve opens in both the fifth and sixth embodiments.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An engine control apparatus comprising;
    means for calculating amount of fuel remaining in the neighborhood of the engine intake port or in the intake pipe while starting engine at a low temperature into the amount of a balanced liquid film remaining stably in the neighborhood of the engine intake port or in the intake pipe and the amount of an unbalanced liquid film which is to be inhaled into cylinder after a sufficient number of cycles is elapsed, and
    a means for correcting the fuel injection amount based on the unbalanced liquid film amount.

2. The engine control apparatus according to claim 1, comprising:
    a means for predictively calculating the amount of the unbalanced liquid film fuel flowing into the cylinder in the next cycle.

3. The engine control apparatus according to claim 1, comprising:
a means for correcting the fuel injection amount of the next cycle based on the amount of the unbalanced liquid film fuel flowing into the cylinder in the next cycle.

4. The engine control apparatus according to claim 1, comprising:
a means for determining plural fuel properties and the corresponding balanced liquid film amounts;
a means for detecting the actual fuel property directly or indirectly; and
a means for determining the balanced liquid film amount corresponding to the actual fuel property detected.

5. The engine control apparatus according to claim 1, further including means for correcting the balanced liquid film amount in accordance with flow speed of air amount inhaled into engine or correlated parameter.

6. The engine control apparatus according to claim 1, wherein the control apparatus is equipped with each cylinder.

7. The engine control apparatus according to claim 1, wherein the fuel injection is started prior to the opening of the intake valve.

8. The engine control apparatus according to claim 1, wherein the fuel injection is terminated prior to the opening of the intake valve.

9. The engine control apparatus according to claim 1, comprising:
a means for controlling, cylinder by cylinder, the amount of the fuel remaining in the neighborhood of the intake port or in the intake pipe of each cylinder before the lapse of selected one of a predetermined number of cycles and a predetermined period of time after starting the engine at a low temperature.

10. The engine control apparatus according to claim 9, wherein the error in the amount of the fuel remaining in the neighborhood of the intake port or in the intake pipe of each cylinder after the lapse of selected one of a predetermined number of cycles and a predetermined period of time after starting the engine at a low temperature is controlled in a predetermined range.

11. The engine control apparatus according to claim 1, wherein the balanced liquid film amount is regarded as balanced liquid film amount of a heavy fuel.

12. The engine control apparatus according to claim 11, wherein the heavy fuel is at least fuel of a heavy property compared to fuel used in emission verification test.

13. The engine control apparatus according to claim 1, wherein the balanced liquid film amount is set to be increased in accordance with selected one of the atmospheric temperature, engine intake air temperature or engine cooling water temperature is lowered.

14. The engine control apparatus according to claim 13, wherein the balanced liquid film amount is expressed by Exp function or inclination based on therefrom, in accordance with selected one of the atmospheric temperature, engine intake air temperature or engine cooling water temperature.

15. The engine control apparatus according to claim 1, comprising:
a means for detecting the fuel temperature directly or indirectly;
a means for determining the balanced liquid film amount in a predetermined fuel property from the fuel temperature;
a means for calculating the target combustion fuel amount; and
a means for injecting, into each cylinder in the first injection session at the time of engine start, the fuel in the amount equal to the sum of the balanced liquid film amount and the target combustion fuel amount.

16. The engine control apparatus according to claim 15,
wherein the fuel temperature detection means detects the fuel temperature based on at least selected one of the atmospheric temperature, the engine intake air temperature and the engine cooling water temperature;
wherein selected one of the atmospheric temperature, the engine intake air temperature and the engine cooling water temperature is allowed to be used as an alternative to the fuel temperature.

17. The engine control apparatus according to claim 15, comprising:
a means for updating by calculation the balanced liquid film amount in a predetermined fuel property from the fuel temperature for each one or a plurality of cycles; and
a means for correcting the fuel injection amount in the next and subsequent injection sessions based on the difference between the previously calculated balanced liquid film amount and the presently calculated balanced liquid film amount.

18. The engine control apparatus according to claim 17, comprising:
a means for updating the unbalanced liquid film amount based on the difference between the previously calculated balanced liquid film amount and the presently calculated balanced liquid film amount; and
a means for correcting the fuel injection amount in the next and subsequent injection sessions based on the unbalanced liquid film amount.

19. The engine control apparatus according to claim 15, comprising:
a means for detecting the engine combustion air-fuel ratio directly or indirectly;
wherein the fuel property is detected based on the combustion air-fuel ratio.

20. The engine control apparatus according to claim 19, comprising:
a means for detecting selected one of the in-cylinder pressure, the axial torque and the emission air-fuel ratio of the engine directly or indirectly;
wherein the combustion air-fuel ratio is detected based on selected one of the in-cylinder pressure, the axial torque and the emission air-fuel ratio.

21. The engine control apparatus according to claim 19, comprising:
a means for detecting the engine speed change directly or indirectly;
wherein the combustion air-fuel ratio is detected based on the amount of the fuel and the air supplied to the engine and the engine speed change.

* * * * *